(12) United States Patent
Höglund et al.

(10) Patent No.: US 11,153,882 B2
(45) Date of Patent: Oct. 19, 2021

(54) RESOURCE CONFIGURATION IN A WIRELESS COMMUNICATION SYSTEM

(71) Applicant: Telefonaktiebolaget LM Ericsson (publ), Stockholm (SE)

(72) Inventors: Andreas Höglund, Solna (SE); Magnus Stattin, Upplands Väsby (SE); Yutao Sui, Solna (SE); Stefan Wänstedt, Luleå (SE); Emre Yavuz, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 201 days.

(21) Appl. No.: 16/342,270

(22) PCT Filed: Feb. 15, 2019

(86) PCT No.: PCT/SE2019/050133
§ 371 (c)(1),
(2) Date: Apr. 16, 2019

(87) PCT Pub. No.: WO2019/160490
PCT Pub. Date: Aug. 22, 2019

(65) Prior Publication Data
US 2021/0084639 A1    Mar. 18, 2021

Related U.S. Application Data

(60) Provisional application No. 62/631,488, filed on Feb. 15, 2018.

(51) Int. Cl.
*H04W 72/04* (2009.01)
*H04W 4/80* (2018.01)
*H04W 76/27* (2018.01)

(52) U.S. Cl.
CPC .......... *H04W 72/048* (2013.01); *H04W 4/80* (2018.02); *H04W 72/042* (2013.01); *H04W 72/0446* (2013.01); *H04W 76/27* (2018.02)

(58) Field of Classification Search
None
See application file for complete search history.

(56) References Cited

U.S. PATENT DOCUMENTS

2018/0014284 A1* 1/2018 Yi .................. H04L 5/0091
2018/0049217 A1* 2/2018 Dinan ............ H04W 72/048
(Continued)

OTHER PUBLICATIONS

Huawei, et al., "Revised WID on Further NB-IoT enhancements", 3GPP TSG RAN Meeting #76, West Palm Beach, USA, Jun. 5, 2017, pp. 1-5, RP-171428, 3GPP.
(Continued)

*Primary Examiner* — Anh Vu H Ly
(74) *Attorney, Agent, or Firm* — Sage Patent Group

(57) ABSTRACT

A user equipment may receive a configuration that configures the user equipment with a resource that is to repeat in time according to an interval. The user equipment may further receive control signalling indicating a parameter N. This parameter N indicates a number of repetitions of the resource that are to occur before the configuration is to be deactivated. The user equipment may also transmit or receive data on one or more repetitions of the resource according to the configuration. The user equipment may then deactivate the configuration upon occurrence of the number of repetitions of the resource indicated by the parameter N.

17 Claims, 21 Drawing Sheets

(56) References Cited

U.S. PATENT DOCUMENTS

| | | | | |
|---|---|---|---|---|
| 2018/0049229 A1* | 2/2018 | Dinan | .................. | H04L 1/1896 |
| 2018/0176945 A1* | 6/2018 | Cao | .................. | H04W 72/1268 |
| 2018/0288746 A1* | 10/2018 | Zhang | .................. | H04L 1/0031 |
| 2018/0323909 A1* | 11/2018 | Ying | .................. | H04L 1/0072 |
| 2018/0368117 A1* | 12/2018 | Ying | .................. | H04L 5/0044 |
| 2018/0368157 A1* | 12/2018 | Jeon | .................. | H04L 5/0044 |
| 2018/0368174 A1* | 12/2018 | Jeon | .................. | H04W 72/0446 |
| 2018/0368175 A1* | 12/2018 | Jeon | .................. | H04W 72/04 |
| 2019/0053211 A1* | 2/2019 | Ying | .................. | H04W 72/044 |
| 2019/0230578 A1* | 7/2019 | Karaki | .................. | H04W 74/0816 |
| 2019/0245657 A1* | 8/2019 | Lee | .................. | H04L 1/1812 |
| 2019/0356427 A1* | 11/2019 | Babaei | .................. | H04W 72/042 |
| 2020/0045706 A1* | 2/2020 | Shin | .................. | H04L 1/1812 |
| 2020/0146032 A1* | 5/2020 | Bae | .................. | H04L 1/08 |
| 2020/0267696 A1* | 8/2020 | Li | .................. | H04W 72/0406 |
| 2020/0367182 A1* | 11/2020 | Zou | .................. | H04W 72/04 |
| 2021/0014875 A1* | 1/2021 | Lee | .................. | H04W 28/0278 |

OTHER PUBLICATIONS

Ericsson, et al., "New WI on Even further enhanced MTC for LTE", 3GPP TSG RAN Meeting #75, Dubrovnik, Croatia, Mar. 6, 2017, pp. 1-4, RP-170732, 3GPP.

Huawei et al., "Semi-Persistent Scheduling in NB-IoT", 3GPP TSG-RAN WG2 Meeting #99, Berlin, Germany, Aug. 21, 2017, pp. 1-5, R2-1708302, 3GPP.

LG Electronics Inc., "Consideration on SPS for NB-IoT", 3GPP TSG-RAN WG2 Meeting #99, Berlin, Germany, Aug. 21, 2017, pp. 1-2, R2-1708852, 3GPP.

\* cited by examiner

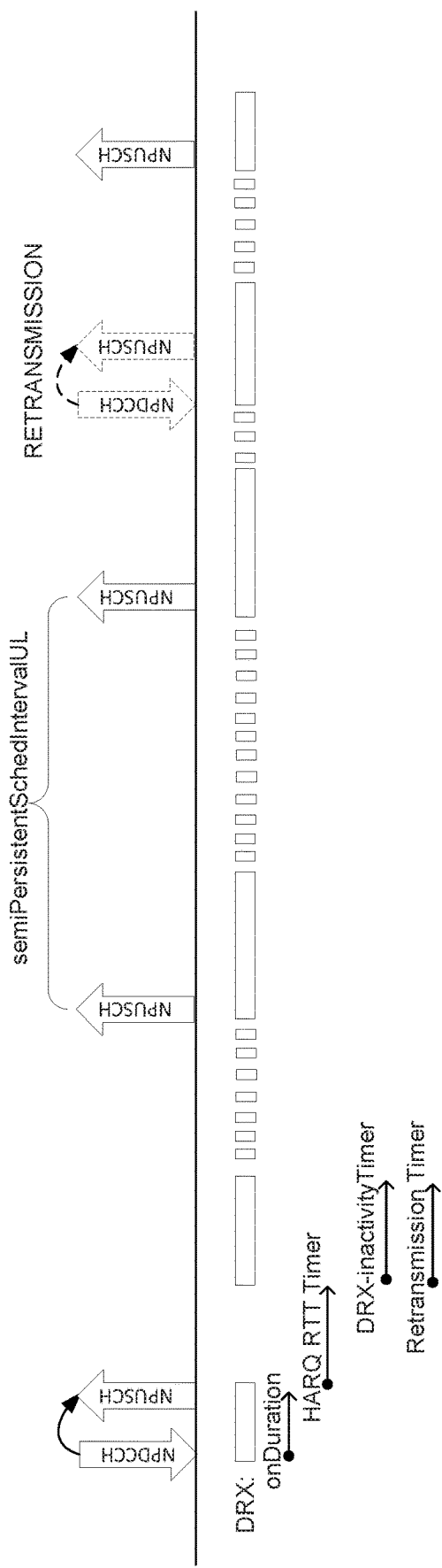

RESOURCE CONFIGURATION IN A WIRELESS COMMUNICATION SYSTEM

TECHNICAL FIELD

The present application relates generally to a wireless communication system, and relates more particularly to configuration of a resource for use by a user equipment in such a system.

BACKGROUND

Semi-persistent scheduling (SPS) in a wireless communication system reduces control signalling overhead that would otherwise be incurred by repeatedly transmitting the same resource grant or assignment to a user equipment (e.g., for services like Voice over IP). The network in this regard transmits an SPS configuration to the user equipment using radio resource control (RRC) signalling. The SPS configuration indicates an interval according to which an uplink grant or a downlink assignment is to repeat in time for the user equipment. The SPS configuration, and the associated grant/assignment repetition, may then simply be activated or deactivated as needed using dynamic control signalling. Accordingly, dynamic control signalling need only be communicated for activating the SPS configuration and for later deactivating the SPS configuration, rather than for repeatedly communicating resource grants or assignments.

Still, in some contexts with low expected throughput, such as Narrowband Internet-of-Things (NB-IoT) use cases, the dynamic control signalling for activation and deactivation contributes meaningful signalling overhead compared to the amount of user/application data transferred. Worse, the need for a user equipment to periodically monitor for downlink control signalling in these and other contexts threatens to consume the user equipment's power even if this signalling overhead could be reduced.

SUMMARY

According to some embodiments herein, a configuration that configures a user equipment with a resource which repeats in time is deactivated after a certain number of repetitions of the resource occur. The certain number of repetitions may be indicated for example by control signalling that is included in the configuration itself or that the user equipment otherwise receives before transmitting or receiving data on any of the repetitions of the resource. In some embodiments, then, the control signalling pre-defines how many repetitions of the resource will trigger deactivation of the configuration, in advance of those repetitions actually occurring. That is, rather than the control signalling being sent after those repetitions occur and commanding the user equipment to deactivate the configuration immediately, the control signalling in some embodiments simply indicates the number of repetitions whose occurrence in the future is to trigger the user equipment to deactivate the configuration. These and other embodiments may advantageously provide greater flexibility on when and/or how to transmit the control signalling to the user equipment for defining when the configuration is to be deactivated. Especially where the control signalling is included in the configuration or otherwise accompanies other signalling, some embodiments may advantageously reduce overall control signalling overhead.

More particularly, some embodiments herein include a method performed by a user equipment. The method comprises receiving a configuration that configures the user equipment with a resource that is to repeat in time according to an interval. The method may also comprise receiving control signalling indicating a parameter N. The parameter N indicates a number of repetitions of the resource that are to occur before the configuration is to be deactivated. In some embodiments, the method also comprises transmitting or receiving data on one or more repetitions of the resource according to the configuration. The method may alternatively or additionally include deactivating the configuration upon occurrence of the number of repetitions of the resource indicated by the parameter N.

In some embodiments, the control signalling is received before transmitting or receiving the data on any of the repetitions of the resource.

In some embodiments, the control signalling is included in downlink control information. In this case, for example, one or more bits in the downlink control information may indicate whether the downlink control information includes the control signalling. In other embodiments, the control signalling is included in the configuration.

In some embodiments, the configuration is received via radio resource control, RRC, signalling.

In some embodiments, the method also includes activating the configuration upon receiving the configuration.

In some embodiments, the user equipment is a narrowband internet-of-things, NB-IoT, device.

Embodiments herein also include a method performed by a network node. The method includes transmitting, to a user equipment, a configuration that configures the user equipment with a resource that is to repeat in time according to an interval. The method also includes transmitting, to the user equipment, control signalling indicating a parameter N. The parameter N indicates a number of repetitions of the resource that are to occur before the configuration is to be deactivated. In some embodiments, the method further includes transmitting or receiving data on one or more repetitions of the resource according to the configuration. Alternatively or additionally, the method may include deactivating the configuration upon occurrence of the number of repetitions of the resource indicated by the parameter N.

In some embodiments, the control signalling is transmitted before transmitting or receiving the data on any of the repetitions of the resource.

In some embodiments, the control signalling is included in downlink control information. In this case, for example, one or more bits in the downlink control information may indicate whether the downlink control information includes the control signalling. In other embodiments, the control signalling is included in the configuration.

In some embodiments, the configuration is transmitted via radio resource control, RRC, signalling.

In some embodiments, the method also includes activating the configuration upon transmitting the configuration.

In some embodiments, the user equipment is a narrowband internet-of-things, NB-IoT, device.

In some embodiments, the method further comprises determining the parameter N based on: an amount of the data in an uplink or downlink buffer to be transmitted or received; and a transport block size limitation of the user equipment. In one embodiment, for example, determining the parameter N comprises determining the parameter N as being a number of transport blocks needed to transmit the amount of the data, where each transport block is limited in size according to the transport block size limitation.

In some embodiments, the method further comprises determining the parameter N based on one or more of: an amount of the data in an uplink or downlink buffer to be transmitted or received; predicted traffic; a quality of service profile; and overprovisioning to account for one or more retransmissions being needed.

Embodiments herein also include corresponding apparatus, computer programs, and carriers. For example, some embodiments herein include a user equipment configured to receive a configuration that configures the user equipment with a resource that is to repeat in time according to an interval. The user equipment may also be configured to receive control signalling indicating a parameter N. The parameter N indicates a number of repetitions of the resource that are to occur before the configuration is to be deactivated. In some embodiments, the user equipment is also configured to transmit or receive data on one or more repetitions of the resource according to the configuration. The user equipment may alternatively or additionally be configured to deactivate the configuration upon occurrence of the number of repetitions of the resource indicated by the parameter N.

Embodiments further include a network node configured to transmit, to a user equipment, a configuration that configures the user equipment with a resource that is to repeat in time according to an interval. The network node also is configured to transmit, to the user equipment, control signalling indicating a parameter N. The parameter N indicates a number of repetitions of the resource that are to occur before the configuration is to be deactivated. In some embodiments, the network node further is configured to transmit or receive data on one or more repetitions of the resource according to the configuration. Alternatively or additionally, the network node may be configured to deactivate the configuration upon occurrence of the number of repetitions of the resource indicated by the parameter N.

BRIEF DESCRIPTION OF THE DRAWINGS

FIG. 1D is a block diagram of an example NPUSCH transmission and its lack of acknowledgement in SPS according to some embodiments.

DETAILED DESCRIPTION

Figure 1A:
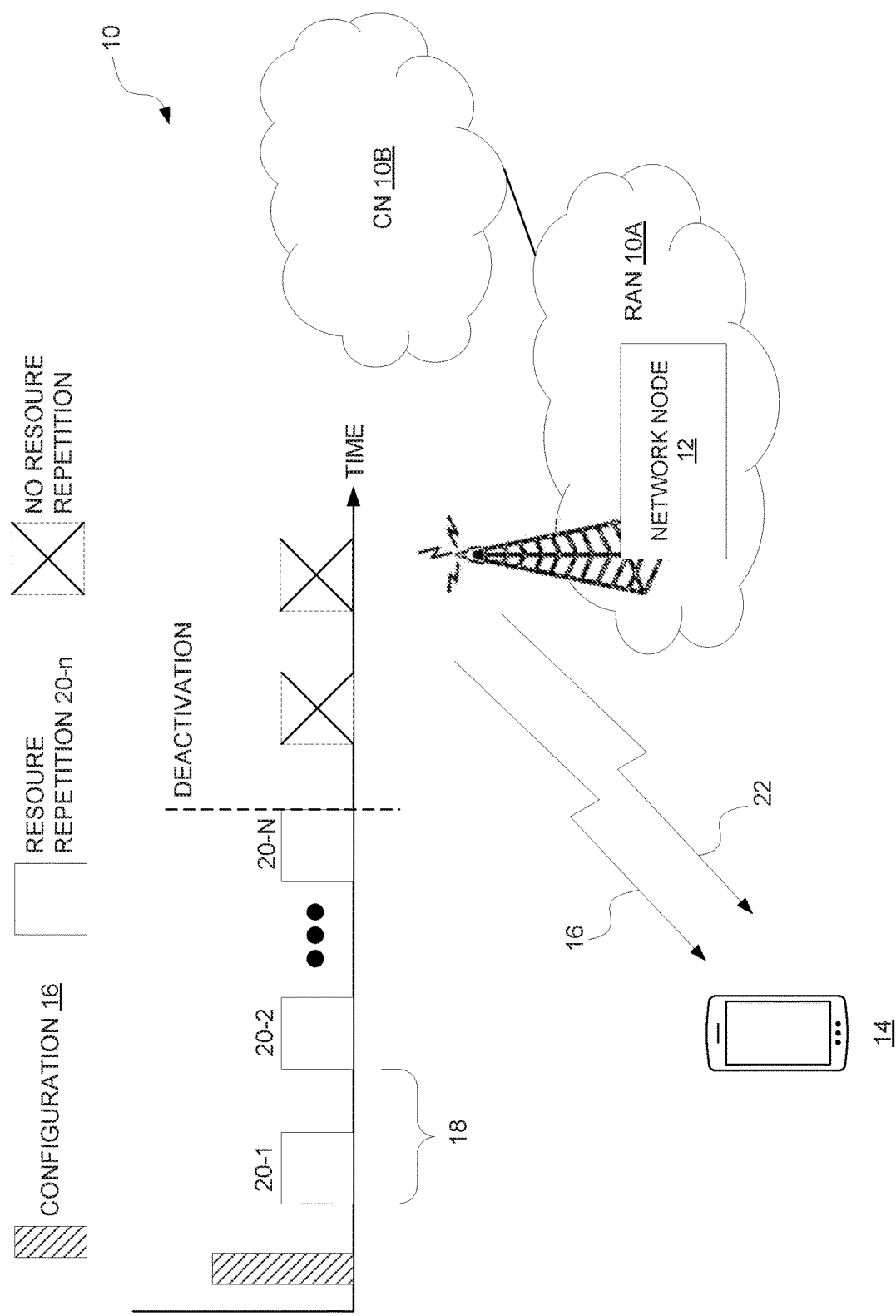
FIG. 1A is a block diagram of a wireless communication system that includes a user equipment and a network node according to some embodiments.

FIG. 1A shows a wireless communication system 10 (e.g., a Narrowband Internet-of-Things, NB-IoT, system) according to some embodiments. The system 10 includes a radio access network (RAN) 10A and a core network (CN) 10B. The RAN 10A provides radio access to one or more user equipments (UEs) and provides a connection to the CN 10B. The UEs may be NB-IoT devices in one example. The CN 10B in turns connects to one or more external networks, such as the Internet.

More particularly in FIG. 1A, a network node 12 (e.g., a base station) is configured to provide radio access to a user equipment (UE) 14. In this regard, the network node 12 according to some embodiments transmits a configuration 16 to the UE 12, e.g., via radio resource control (RRC) signalling. The UE 12 in turns receives this configuration 16. The configuration 16 configures the UE 14 with a resource (e.g., a radio resource in time and/or frequency) that is to repeat in time according to an interval 18, e.g., upon the configuration 16 being activated. FIG. 1A shows for instance that repetitions 20-1, 20-2, . . . of the resource occur repeatedly according to such an interval 18. The configuration 16 in some embodiments may for instance indicate the interval 18, e.g., in terms of a periodicity. The configuration 16 in one or more embodiments may even indicate the resource, e.g., in terms of a time and/or frequency location of the resource. Regardless, with the resource repeating in time, the configuration 16 in some embodiments may be referred to as a multi-grant configuration, e.g., in the sense that the configuration 16 configures the UE 14 with multiple, repeating grants of the resource. In other embodiments, the configuration 16 may be referred to as a semi-persistent scheduling (SPS) configuration.

Regardless, the network node 12 according to some embodiments also transmits control signalling 22 to the UE 14. The UE 14 in turn receives this control signalling 22. The control signalling 22 notably indicates a parameter N. This parameter N indicates the number of repetitions of the resource that are to occur before the configuration 16 is to be deactivated. Based on this control signalling 22, then, the network node 12 and/or UE 14 deactivates the configuration 16 upon occurrence of the number N of repetitions of the resource indicated by the parameter. As shown in FIG. 1A, for example, no more repetitions of the resource recur (at least as granted for the UE 14) after N repetitions occur. The control signalling 22 therefore effectively specifies an (predetermined) endpoint of the configuration 16, i.e., as being the Nth repetition. Where the configuration 16 is an SPS configuration, for instance, the control signalling 22 may effectively specify an (predetermined) SPS endpoint. Regardless, the control signalling 22 makes clear which resource repetition is to be the last one before deactivation of the configuration 16.

In fact, in some embodiments, the UE 14 itself monitors how many repetitions of the resource occur since activation of the configuration 16. The UE 14 may meanwhile transmit or receive data (e.g., application/user data) on one or more repetitions of the resource according to the configuration 16. But once the number N of repetitions indicated by the control signalling 22 occur, the UE 14 autonomously deactivates the configuration 16, i.e., without having received any further control signalling to that effect from the network node 12.

In some embodiments, the control signalling 22 is included in the configuration 16 itself, e.g., as an information element (IE) within the configuration 16. Alternatively or additionally, the control signalling 22 in some embodiments is received before transmitting or receiving data on any of the repetitions of the resource.

In some embodiments, then, the control signalling 22 effectively pre-defines how many repetitions of the resource will trigger deactivation of the configuration 16, in advance of those repetitions actually occurring. That is, rather than the control signalling 22 being sent after those repetitions occur and commanding the UE 14 to deactivate the configuration 16 immediately, the control signalling 22 in some embodiments simply indicates the number N of repetitions whose occurrence in the future is to trigger the UE 14 to deactivate the configuration 16.

These and other embodiments may advantageously provide greater flexibility on when and/or how to transmit the control signalling 22 to the UE 14 for defining when the configuration 16 is to be deactivated. Especially where the control signalling 22 is included in the configuration 16 or otherwise accompanies other signalling, some embodiments may advantageously reduce overall control signalling overhead.

Some embodiments herein may be exploited when a transport block size limitation of the UE 14 is exceeded, e.g., as may be the case for a large unicast transmission. Such a limitation may for instance be 1000 bits in UL and 680 bits in DL for Cat-NB1, 2536 bits for both UL and DL for Cat-NB2. Regardless, in one or more embodiments, the network node 10 determines the parameter N based on an amount of the data in an uplink or downlink buffer to be transmitted or received, and a transport block size limitation of the UE 14. For instance, the network node 12 may determine the parameter N as being a number of transport blocks needed to transmit the amount of the data, where each transport block is limited in size according to the transport block size limitation. Alternatively or additionally, the network node 12 may determine the parameter N based on one or more of: an amount of the data in an uplink or downlink buffer to be transmitted or received; predicted traffic; a quality of service profile; and overprovisioning to account for one or more retransmissions being needed.

Alternatively or additionally, in some embodiments, the UE 14 is configured to determine a discontinuous reception (DRX) configuration or DRX cycle length based on whether or not the configuration 16 is configured (or active). For example, the UE 14 determine to apply a DRX configuration with a relatively shorter DRX cycle length or a relatively longer DRX cycle length, depending respectively on whether the configuration 16 is not or is configured (or active). That is, when the configuration 16 is configured (or active), the UE's DRX cycle length is longer than it is when the configuration 16 is not configured (or active). This way, when the configuration 16 is configured (or active), the UE 14 can more infrequently check for retransmissions or possible configuration deactivations. Such a longer DRX cycle may advantageously conserve UE power.

Consider now some embodiments described at times with reference to particular contexts and/or networks, such as Machine Type Communication (MTC) and/or Narrowband Internet-of-Things (NB-IoT). Some embodiments below are presented in which the resource of FIG. 1A is exemplified as an NPDSCH or NPUSCH resource, the configuration 16 is exemplified as a multi-grant configuration or an SPS configuration, the UE 14 is exemplified as an NB-IoT device, and the parameter N is exemplified as a factor N.

Machine type communication (MTC) is about providing connectivity for devices which communicate without human interaction; that is, providing cellular connectivity for the internet of things (IoT). It is predicted to increase the number of connections exponentially more than the increase of human subscriptions and the number of fixed connections. This is sometimes referred to as 'the networked society'. Because of the different nature, the requirements are also different from those of human oriented smart phone traffic. MTC devices need to have low cost, which is achieved by low UE complexity and reduced capabilities (e.g., one receiving antenna, a narrow device bandwidth smaller than the system bandwidth, etc.). The power consumption should further be low in order to prolong battery such that interactive battery charging is not required, preferably throughout the life span of the device. To be able to reach devices in challenging locations, e.g. basements, it is desirable to enhance coverage in comparison to normal systems. In Rel-13 three different radio access technologies were introduced for this purpose in 3GPP; Long Term Evolution MTC (LTE-MTC), NB-IoT, and Extended Coverage Global System for Mobile communications (EC-GSM). In addition to 3GPP technologies, there are a number of IoT solutions designed for unlicensed band operation.

NB-IoT was introduced in 3GPP Release 13 and supports enhancements to support Machine-Type Communications (MTC) with a new radio interface (and UE categories Cat-NB1 and Cat-NB2). (The notation NB-IoT is here used for any Release). The objective of NB-IoT according to Release 13 is to specify a radio access for cellular internet of things that addresses improved indoor coverage, support for massive number of low throughput devices, low delay sensitivity, ultra-low device cost, low device power consumption and (optimized) network architecture.

For NB-IoT, three different operation modes are defined, i.e., stand-alone, guard-band, and in-band. In stand-alone mode, the NB-IoT system is operated in dedicated frequency bands. For in-band operation, the NB-IoT system can be placed inside the frequency bands used by the current LTE system, while in the guard-band mode, the NB-IoT system can be operated in the guard band used by the current LTE system. NB-IoT can operate with a system bandwidth of 180 kHz (Cat-NB1, Cat-NB2). NB-IoT supports multi-carrier operation, where several 180 kHz physical resource blocks (PRBs) can be used, e.g., for increasing the system capacity, inter-cell interference coordination, load balancing, etc. The NB-IoT device listens to the system information on the anchor carrier, but when there is data, the communication can be moved to a secondary carrier. Rel-13 UEs need to use the anchor carrier for random access whereas Rel-14 UEs may use the non-anchor carriers if configured. Otherwise, such as when attempting to access the network for attach, Rel-14 UEs also need to use the anchor carrier.

NB-IoT uses repeated transmissions to extend its coverage compared to earlier supported 3GPP radio access technologies. When accessing the system, a UE may for example repeat the Narrow Band Random Access Channel (NPRACH) preamble transmission up to 128 times to achieve coverage in the most demanding situations. The NB-IoT radio interface has therefore been designed with three separate NPRACH radio resources that are each associated with a coverage range and a set of repetitions. That is, coverage enhancement (CE) levels 0,1, and 2 are supported, unlike eMTC which supports 4. The UE selects the CE-level and NPRACH resource in the same manner based on reference signal received power (RSRP) measurement.

For Rel-15 NB-IoT, there is a need to investigate if semi-persistent scheduling (SPS) can help reduce power consumption and latency for NB-IoT. In other words, there is a need to investigate; further latency and power consumption reduction; and power consumption reduction for physical channels. There is also a need to study and, if found beneficial, support uplink (UL) downlink (DL) semi-persistent scheduling.

SPS was introduced for LTE to reduce Physical Downlink Control Channel (PDCCH) overhead for services like e.g. Voice over IP (VoIP). Indeed, with VoIP a voice packet/frame needs to be transmitted every 20 ms and it has the same size, Transport Block Size (TBS), Modulation and Coding Scheme (MCS), etc. Therefore, with the SPS downlink control information (DCI), either in the form of an uplink grant or downlink assignment, is repeated in time according to an interval configured via RRC in the SPS configuration. Therefore PDCCH need only be transmitted for the first voice frame (activating SPS) and later when deactivating SPS. SPS is configured by RRC and from that point on a UE monitors DCI also with an SPS cell radio network temporary identifier (C-RNTI). When a DCI is transmitted in PDCCH which is scrambled with this SPS C-RNTI, SPS is activated. This reduces a lot of PDCCH transmissions in the network. And, since PDCCH capacity is more limiting than the Physical Uplink Shared Channel (PUSCH) or Physical Downlink Shared Channel (PDCCH) for low-rate services like VoIP, it will also make it possible to schedule more simultaneous VoIP calls and hence increase the VoIP capacity.

In Release 14, SPS support was also added to MTC LTE (i.e. LTE-M or eMTC), LTE-M supports high enough throughput such that SPS would be relevant for e.g. VoIP. NB-IoT does not support that high throughput and therefore the use cases for NB-IoT SPS are somewhat different.

For NB-IoT it is not clear what the benefit and use cases for SPS will be. More importantly, reducing the Narrowband PDCCH (NPDCCH) overhead will not improve the UE power consumption which is an objective. Therefore, applying legacy SPS procedure directly to NB-IoT has questionable benefit, and furthermore some NB-IoT specific adoptions may be required in order for it to work at all.

Some embodiments herein provide technical improvements in order to enable NB-IoT SPS to work (NB-IoT adoption part) and to ensure it produces some gains in terms of UE power consumption reduction (optimization part).

Some embodiments are advantageous in that they enable the use of SPS for NB-IoT, for use cases like large unicast file transfer (exceeding the TBS limitation of the Cat-NB UE). Some embodiments are advantageous alternatively or additionally in that they reduce the UE power consumption when SPS is used (which is highly relevant for machine type devices which reside in RRC_CONNECTED for long time and also in line with an objective).

Figure 1B:
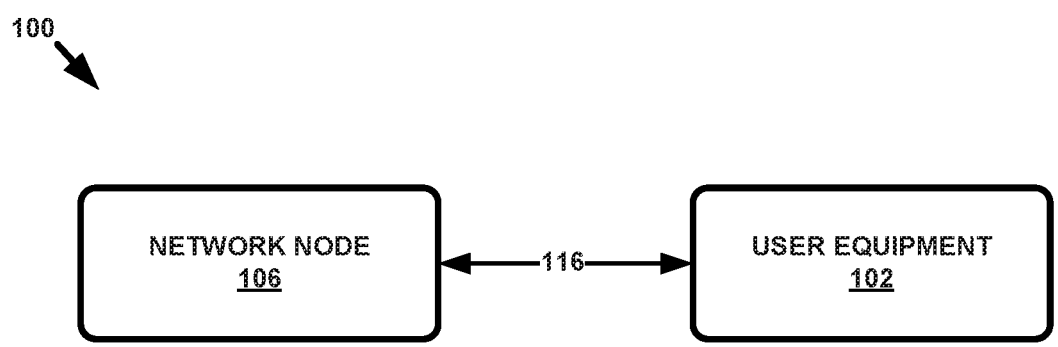
FIG. 1B is a block diagram of a wireless communications network according to some embodiments.

Generally, then, the present disclosure describes various example embodiments that may be implemented in a UE/user equipment 102 and/or network node/base station 106, such as the UE 102 and network node 106 of the wireless communications network 100 of FIG. 1B, which in some cases may be a Narrow-Band IoT compliant network. In an aspect, the UE 102 and network node 106 can communicate application/user data and/or control data over one or more channels 116 according to one or more aspects described in relation to the remaining Figures.

Aspects of the solutions herein comprise a collection of technical improvements to both enable the use of SPS of NB-IoT (NB-IoT specific adoptions) and/or to increase the gains of using SPS for NB-IoT (optimizations).

Deactivation Using Repetition Factor N

One of the most important use cases for NB-IoT SPS is large unicast transmissions. That is, larger than the TBS limitation of the Cat-NB UE (1000 bits in UL and 680 bits in DL for Cat-NB1, 2536 bits for both UL and DL for Cat-NB2). Given the UL or DL buffer size, an eNB can calculate how many transmissions would be required overall for transmitting the segmented data over the air interface. For transmission with SPS this factor N could then be indicated as a pre-determined end point for the SPS. That is, it would be clear both to the UE and eNB which SPS resource (Narrowband PDSCH, NPDSCH, or Narrowband PDSCH, NPUSCH) is the last one before deactivation.

For the configuration there are two alternative embodiments; N can either be configured by RRC (e.g. added to the SPS configuration), or N can be dynamically signaled in DCI. The RRC configuration is mostly relevant if the N is expected to be constant during the connection or one-time-only (see RRC configuration below). The dynamic DCI alternative is better if e.g. the buffer size is not known at the time of RRC configuration or if there will be several file transfers.

The standard related part of this embodiment would be the configuration and signaling of the parameter N. The implementation specific aspect would be the determination of N, calculated as a function of e.g. the buffer size, predicted traffic, application, QoS profile (Qos Class Identifier, CI), any overprovisioning to account for (Hybrid Automatic Repeat Request, HARQ) retransmissions, etc.

Note that it would be desired to keep this multi-grant aspect using the repetition factor N and regular SPS as being the same solution as far as possible. Therefore, regular SPS in some embodiments is included as a specific multi-grant configuration with N set to infinity.

Further, for very few transmissions it could be argued that an additional NPDCCH transmission does not have too large of a negative impact and dynamical scheduling could be used up until a low factor N. On the other hand, for very large N, e.g. on the order of a hundred transmissions, it could be argued that an additional NPDCCH transmission in the end to deactivate SPS does not have too large of a negative impact. As part of some embodiments, then, the breaking points for this could be configured according to the below for increasing file size and number of TBSs/transmissions: Dynamic scheduling→N={3, 4, 5 . . . , 10}→N=inf and deactivation via SFS.

The inclusion of N in a DCI could potentially increase the DCI size; that is, if existing fields cannot be reused to carry the N bits. Maintaining the low complexity of Cat-NB UEs, it is not feasible that the UE can decode DCI of different sizes simultaneously. In such case, zeroes could be added to the legacy DCI (scrambled with C-RNTI) whenever SPS is configured. This since, whenever SPS is configured the UE will have to descramble the DCI both using C-RNTI (dynamic transmissions) and using SPS C-RNTI (SPS activation/deactivation, SPS override, SFS retransmission).

This embodiment is not limited to NB-IoT but could be generalized to SPS in general (E.g, to LTE or LTE-M).

Periodic NPUSCH Resources for ACKs for DL SPS

Figure 1C:
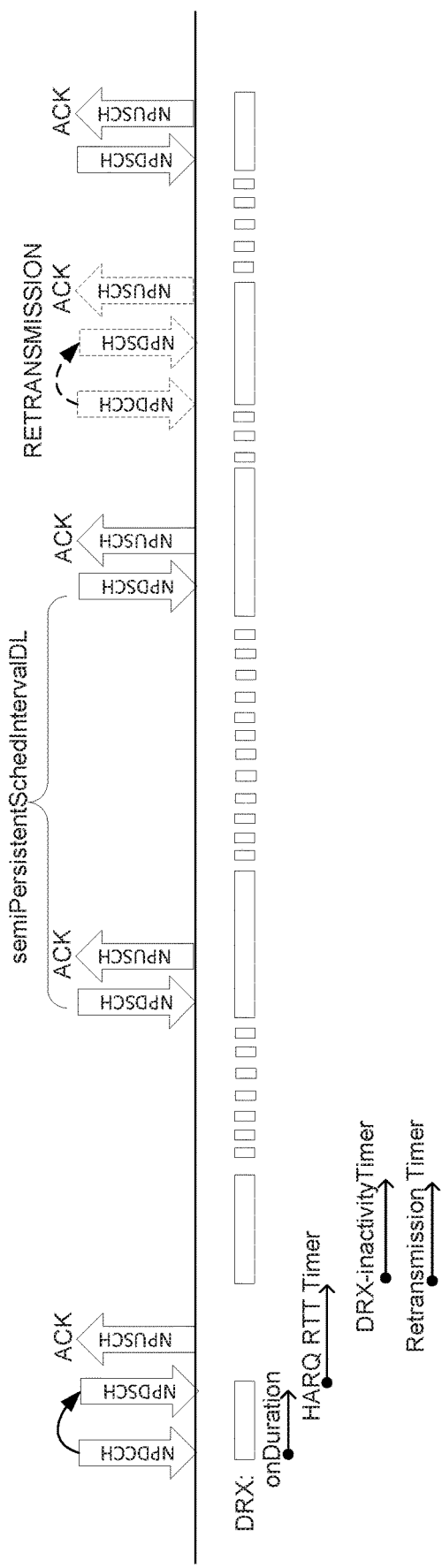
FIG. 1C is a block diagram of an example NPDSCH transmission and its acknowledgement in SPS according to some embodiments.

For DL SPS, the NPDSCH transmission will have to be acknowledged (see FIG. 1C). This since the eNB would not otherwise know if it should schedule new data or a retransmission. In NB-IoT there is no PUCCH channel and the acknowledgement to NPDSCH transmissions are instead sent over NPUSCH format 2. As of NB-IoT Release 13, 4 bits in DCI format N1 for DL assignment points out such a NPUSCH resource (see IE 'HARQ ACK-resource' in DCI format N1 in TS 36.212). The problem is that this is a one-time-only resource and for the SPS operation a periodic resource would be required as indicated in FIG. 1C. According to some embodiments herein, the NPUSCH format 2 resource for ACK would follow the same periodic repetition as the configured NPDSCH resource. That is, according to semiPersistSchedIntervalDL (and possibly other relevant parameters). In an alternative embodiment, this would be explicit rather than implicit and new IEs may be added to the SPS configuration for this purpose (note this is less likely however since the intervals would have to match, unless some kind of HARQ ACK bundling is applied).

SPS Override of DRX-Config-NB

As mentioned above, SPS will not provide any gains for UE power consumption per se. That is, if the UE continuously need to monitor NPDCCH, there will be only a minor or negligible gain from actually not transmitting NPDCCH. The UE power consumption will therefore be mainly dependent on the Medium Access Control (MAC) timers and Discontinuous Reception (DRX) cycle length provided in DRX-Config-NB (see TS 36.331). The ranges of these parameters are already quite generous and should already allow for minimizing the UE power consumption: The drx-Cycle can be configured from sf256 to sf10240, the onDurationTimer can be as short as 1 NPDCCH, and the drx-inactivityTimer and drx-RetransmissionTimers can be set to zero. However, when SPS is not configured, the UE should relatively frequently check for dynamic scheduling. But when SPS is configured, one could allow for the UE to more quickly go to DRX and more infrequently check for retransmissions and possible SPS deactivation. In this embodiment, a separate configuration for the parameters in DRX-Config-NB is provided to the UE and applied whenever SPS is configured (alternative 1) or activate (alternative 2), i.e. overriding the values provided in DRX-Config-NB in the MAC-MainConfig-NB. Either this configuration could be explicit, e.g. including the information elements (IEs) of DRX-Config-NB in the SPS RRC configuration, or a preconfigured offset could be applied. An example of the latter would be applying a factor k={2, 4, 8, . . . } longer drx-Cycle, and a factor m={2, 4, 8, . . . } shorter timers when using SPS. k and m would then be configured by the network and communicated to the UE by system information broadcast (i.e. added to a System Information Block, SIB), This embodiment is not limited to NB-IoT but could be generalized to SPS in general (E.g. to LTE or LTE-M).

Omitting NPDCCH Monitoring for DL SPS Upon ACK

For UL SPS, as shown in FIG. 1D, the UE would not know if the NPUSCH transmission was successfully received and if there will be a retransmission. For DL SPS on the other hand, shown in FIG. 1C, the UE is the receiver of NPDSCH and knows if it was correctly received. If it was correctly received there is no need to monitor NPDCCH for retransmissions until the subsequent SPS NPDSCH resource and in this embodiment the UE could then omit that to reduce the UE power consumption. However, there may still be some need to monitor NPDCCH for dynamic scheduling (using C-RNTI) and/or SPS deactivation (using SPS C-RNTI). Therefore, in an alternative embodiment the NPDCCH monitoring is not completely omitted until the subsequent SPS NPDSCH, but the UE instead applies more sparse monitoring, effectively using a longer drx-Cycle. This drx-Cycle could either be explicitly configured or a scaling of the already used drx-Cycle could be applied (e.g. a factor communicated to the UE in system information broad cast or dedicated RRC signaling).

This embodiment is not limited to NB-IoT but could be generalized to SPS in general (E.g. to LTE or LTE-M).

Enabling 2 HARQ SPS in the Same DCI

Release 13 NB-IoT only supports 1 HARQ process, but in Release 14 support for 2 HARQ processes was introduced for both UL and DL. For NB-IoT, SPS it would be beneficial to support 2 HARQ processes since e.g. the scheduling of retransmissions is more effective in the sense that a semi-PersistSchedInterval of half the length can be applied and still allow for as many opportunities for retransmissions (i.e. good to reduce UE power consumption for larger unicast file transfer). In Release 14, the HARQ process number is then added to the DCI for UL grant and DL assignment as seen in Table 1 and Table 2 below.

TABLE 1

DCI format N0 for UL scheduling

| Field | Size |
|---|---|
| Flag for format N0/format N1 differentiation | 1 bit |
| Subcarrier indication | 6 bits |
| Resource assignment | 3 bits |
| Scheduling delay | 2 bits |
| Modulation and coding scheme | 4 bits |
| Redundancy version | 1 bit |
| New data indicator | 1 bit |
| DCI subframe repetition number | 2 bits |
| Repetition number | 3 bits |
| HARQ process number | 1 bit |
| Sum | 24 bits |

TABLE 2

DCI format N1 for DL scheduling

| Field | Size |
|---|---|
| Flag for format N0/format N1 differentiation | 1 bit |
| NPDCCH order indicator | 1 bit |
| Scheduling delay | 3 bits |
| Resource assignment | 3 bits |
| Modulation and coding scheme | 4 bits |
| DCI subframe repetition number | 2 bits |
| New data indicator | 1 bit |
| Repetition number | 4 bits |
| HARQ-ACK resource | 4 bits |
| HARQ process number | 1 bit |
| Sum | 24 bits |

That is, the HARQ process number is explicitly indicated, and it would require two NPDCCHs/DCIs to activate SPS for both HARQ processes. In some embodiments presented here, the idea is to be able to activate or deactivate the SPS for both HARQ processes with only one NPDCCH/DCI. One way to do that is that the indicated HARQ process number is interpreted as the starting HARQ process and that every other HARQ process is used for semiPersistSched-Interval. That is, for each individual HARQ process the effective SPS interval is twice the configured semiPersistSchedInterval. Whether this scheme applies for the individual HARQ processes (i.e., to which HARQ processes the scheme and/or NPDCCH/DCI applies) could be configured to allow for a more flexible solution. The configuration could e.g. either be in dedicated RRC signaling or in a system information broadcast.

Another way to do this is when the SPS is configured, the network can indicate whether one or two HARQ processes are configured for the SPS. Some embodiments in this regard introduce a new field in the DCI or use an existing filed, e.g., new data indicator (NDI), together with HARQ process number to indicate whether two HARQ processes are activated together. If two HARQ processes are configured, the UE would assume the both HARQ processes are activated if the new field in the DCI or NDI is toggled, and the e.g., the HARQ process number is set to 0. Otherwise, each of the HARQ process is activated individually.

Activation via RRC

In Release 13, NB-IoT was designed for small and infrequent data transactions. That is, the UE would upon these infrequent transmissions move from RRC_IDLE to RRC_CONNECTED to quickly transmit the data payload before moving back to RRC_IDLE, (For the Cellular IoT, CIoT, control plane (CP) optimization RRC re-configuration is not even supported). Even though later releases include more diverse use cases, it could also for NB-IoT SPS be of interest to consider the case where the UE moves to RRC_CONNECTED mode, transmits a large unicast payload using SPS, and is then released back to RRC_IDLE mode. In such case it would perhaps not be required to activate SPS via SPS C-RNTI as in legacy operation, but the SPS could instead be activated directly upon the SPS configuration.

In this case, instead of having the SPS parameters in the DCI, the parameters for SPS could be included in the RRC configuration directly. In later stage, if the network decides to modify or change the SPS parameters, it can use DCI to change the SPS settings. And similarly, the network can use DCI to deactivate the SPS service.

DCI Indication of RNTI-Type

Cat-NB UEs are of low complexity and can be of interest to minimize the requirements for them in order to keep the complexity low (e.g. processing requirements). One thing that adds to the UE complexity is the requirement to monitor multiple RNTIs at the same time (although not as much as monitoring DCIs of different sizes). If this would become an issue, one potential solution is to add 1 bit in DCI to distinguish whether the DCI is used for SPS operation or the UE should interpret the DCI for dynamic scheduler, e.g., fields in the DCI are interpreted in the same way as the DCI scrambled by "C-RNTI", and the extra bits are seen as padding. Note that then only one RNTI would in fact be used for descrambling the DCI transmitted on NPDCCH also when SPS is configured (e.g. C-RNTI or SPS C-RNTI).

Figure 2A:
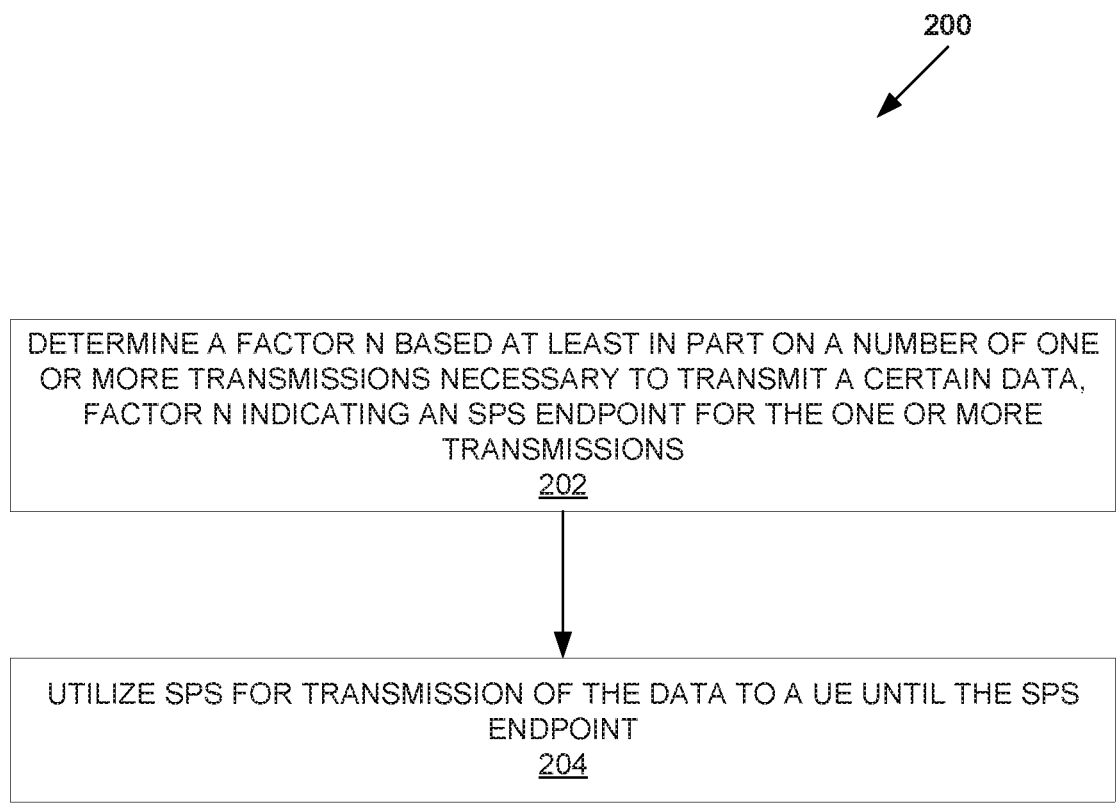
FIG. 2A is a logic flow diagram of a method performed by a user equipment according to some embodiments.
Figure 3A:
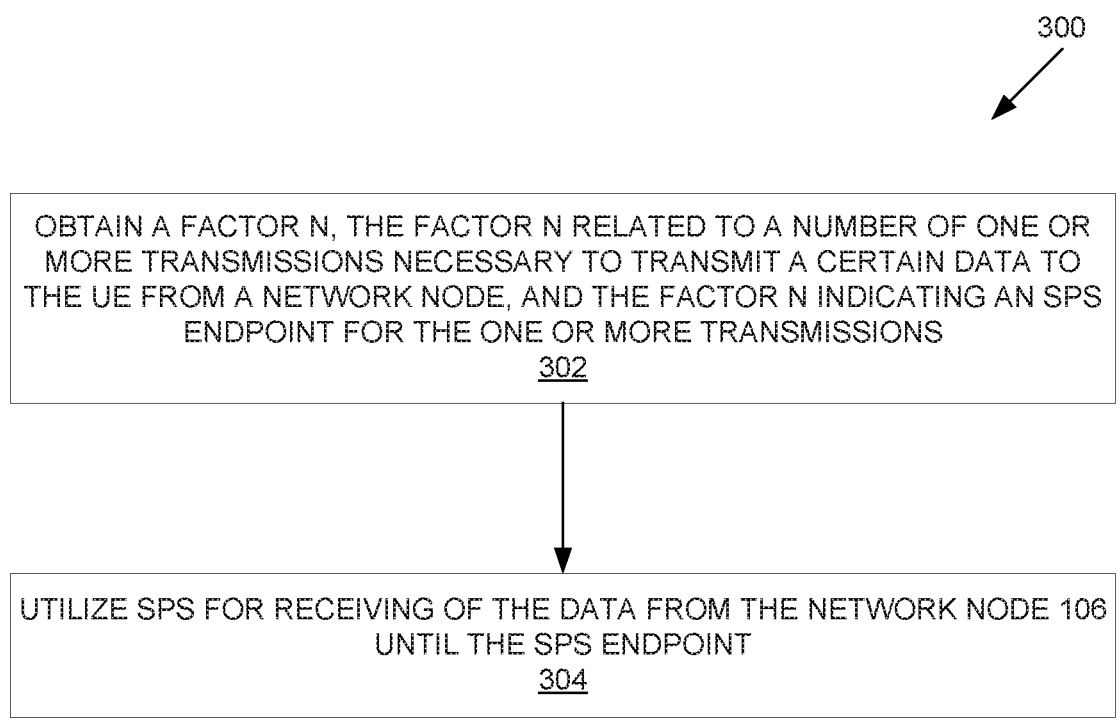
FIG. 3A is a logic flow diagram of a method performed by a network node according to some embodiments.

Turning to FIGS. 2A and 3A, example methods 200 and 300 are presented, which can be performed by network node 106 and/or UE 102 of FIG. 1, respectively. For instance, in FIG. 2A, a method 200 performed by a network node is shown. In some embodiments, at block 202, the method 200 can include determining a factor N based at least in part on a number of one or more transmissions necessary to transmit a certain data, the factor N indicating an SPS endpoint for the one or more transmissions. In addition, in an aspect, method 200 can include, at block 204, utilizing SPS for transmission of the data to a UE 102.

Likewise, in FIG. 3A, a method 300 is shown that can be performed by a UE 102. In an aspect, at block 302, method 300 can include obtaining a factor N, the factor N related to a number of one or more transmissions necessary to transmit a certain data to the UE from a network node, and the factor N indicating an SPS endpoint for the one or more transmissions. In addition, in an aspect, method 300 can include, at block 304, utilizing SPS for receiving of the data from the network node 106.

In addition to these aspects of methods 200 and 300, each of the other aspects of the present techniques introduced above (or further described below) are non-limiting features that can be performed according to one or both of these methods 200 and/or 300.

Figure 2B:
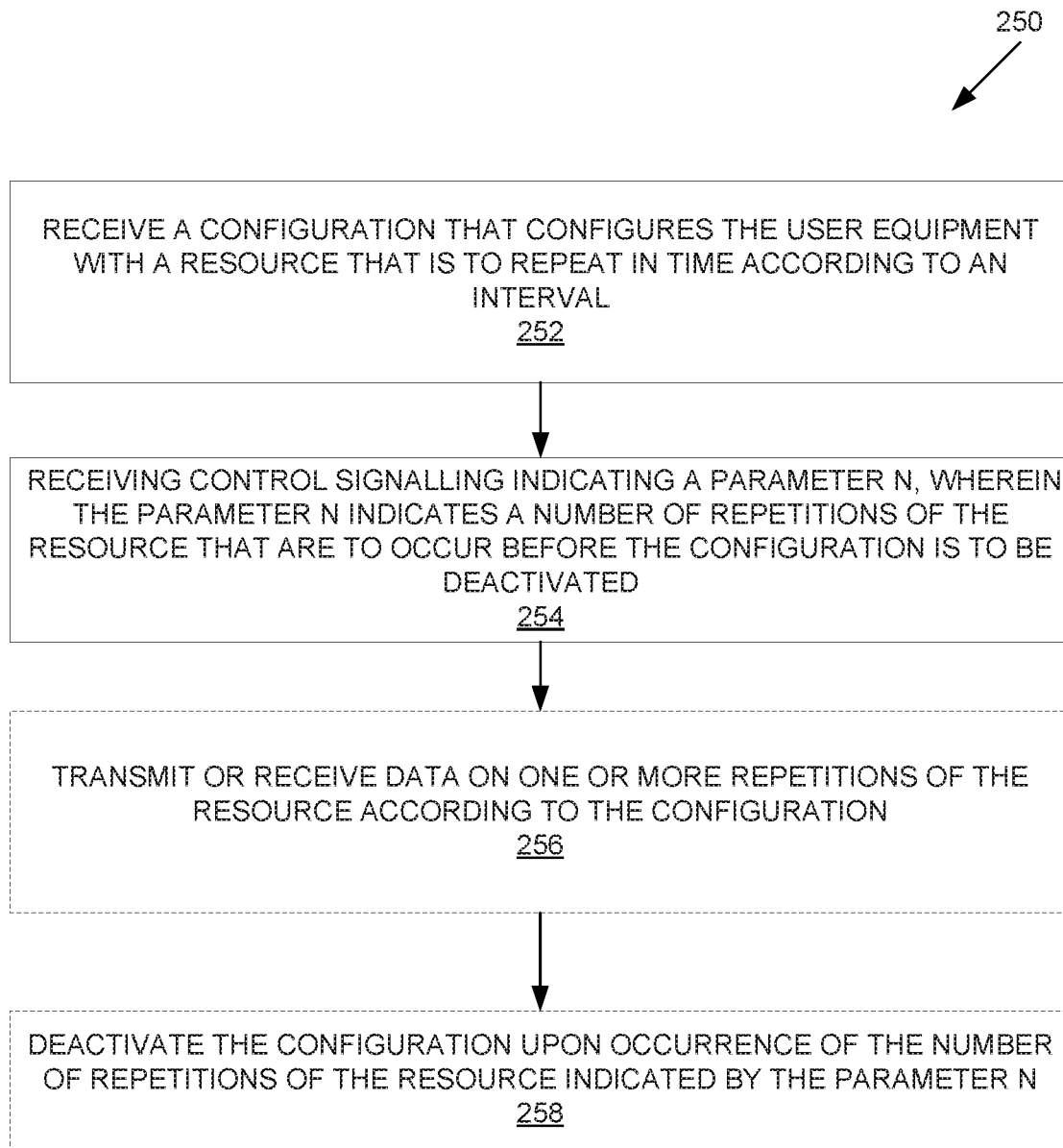
FIG. 2B is a logic flow diagram of a method performed by a user equipment according to other embodiments.

FIG. 2B shows another example method 250 which may be performed by a UE herein. The method 250 as shown at block 252 includes receiving a configuration that configures the user equipment with a resource that is to repeat in time according to an interval. The method 250 also includes at block 254 receiving control signalling indicating a parameter N, wherein the parameter N indicates a number of repetitions of the resource that are to occur before the configuration is to be deactivated. The method 250 in some embodiments may also include at block 256 transmitting or receiving data on one or more repetitions of the resource according to the configuration. In some embodiments, the method 250 further includes at block 258 deactivating the configuration upon occurrence of the number of repetitions of the resource indicated by the parameter N.

In some embodiments, the control signalling is received before transmitting or receiving the data on any of the repetitions of the resource.

In some embodiments, the control signalling is included in downlink control information. In this case, for example, one or more bits in the downlink control information may indicate whether the downlink control information includes the control signalling. In other embodiments, the control signalling is included in the configuration.

In some embodiments, the configuration is received via radio resource control, RRC, signalling.

In some embodiments, the method also includes activating the configuration upon receiving the configuration.

In some embodiments, the user equipment s a narrowband internet-of-things, NB-IoT, device.

Figure 3B:
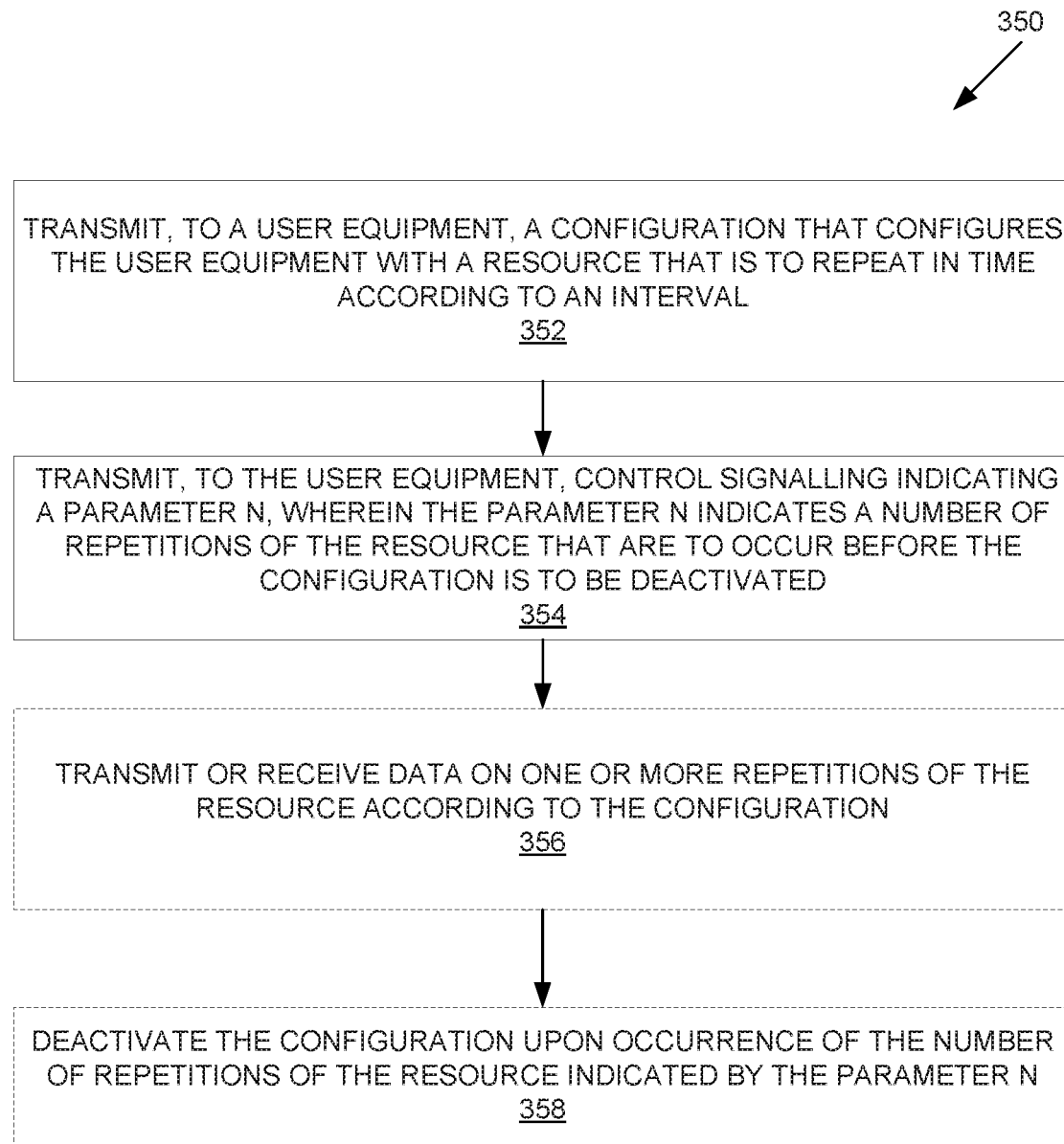
FIG. 3B is a logic flow diagram of a method performed by a network node according to other embodiments.

FIG. 3B shows a corresponding example method 350 which may be performed by a network node herein. The method 350 as shown at block 352 includes transmitting, to a user equipment, a configuration that configures the user equipment with a resource that is to repeat in time according to an interval. The method 350 also includes at block 354 transmitting, to the user equipment, control signalling indicating a parameter N, wherein the parameter N indicates a number of repetitions of the resource that are to occur before the configuration is to be deactivated. The method 350 in some embodiments may also include at block 356 transmitting or receiving data on one or more repetitions of the resource according to the configuration. In some embodiments, the method 350 further includes at block 358 deactivating the configuration upon occurrence of the number of repetitions of the resource indicated by the parameter N.

In some embodiments, the control signalling is transmitted before transmitting or receiving the data on any of the repetitions of the resource.

In some embodiments, the control signalling is included in downlink control information. In this case, for example, one or more bits in the downlink control information may indicate whether the downlink control information includes the control signalling. In other embodiments, the control signalling is included in the configuration.

In some embodiments, the configuration is transmitted via radio resource control, RRC, signalling.

In some embodiments, the method also includes activating the configuration upon transmitting the configuration.

In some embodiments, the user equipment is a narrowband internet-of-things, NB-IoT, device.

In some embodiments, the method further comprises determining the parameter N based on: an amount of the data in an uplink or downlink buffer to be transmitted or received; and a transport block size limitation of the user equipment. In one embodiment, for example, determining the parameter N comprises determining the parameter N as being a number of transport blocks needed to transmit the amount of the data, where each transport block is limited in size according to the transport block size limitation.

In some embodiments, the method further comprises determining the parameter N based on one or more of: an amount of the data in an uplink or downlink buffer to be transmitted or received; predicted traffic; a quality of service profile; and overprovisioning to account for one or more retransmissions being needed.

Figure 4:
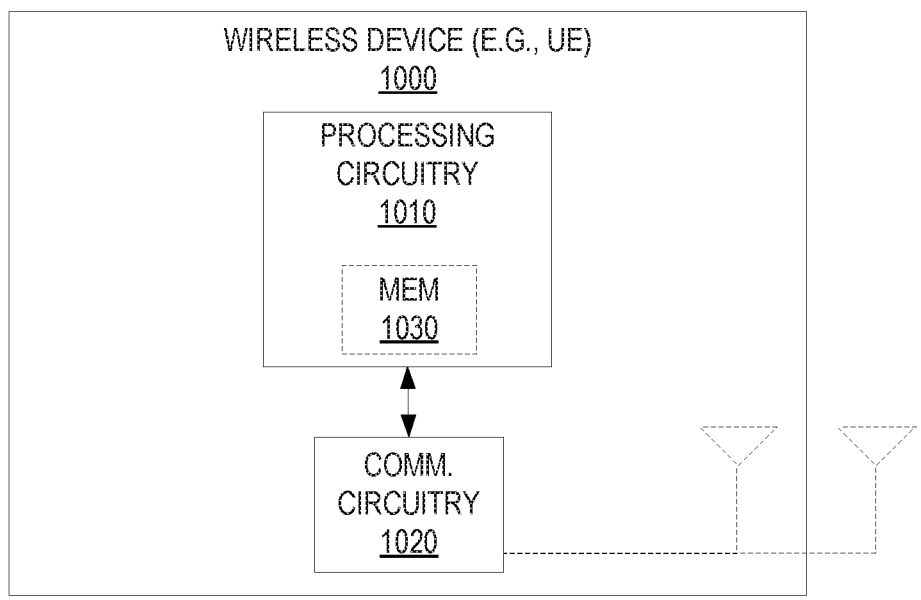
FIG. 4 is a block diagram of a user equipment according to some embodiments.

FIG. 4 as an example illustrates a UE 1000 as implemented in accordance with one or more embodiments. As shown, the UE 1000 includes processing circuitry 1010 and communication circuitry 1020. The communication circuitry 1020 (e.g., radio circuitry) is configured to transmit and/or receive information to and/or from one or more other nodes, e.g., via any communication technology. Such communication may occur via one or more antennas that are either internal or external to the UE 1000. The processing circuitry 1010 is configured to perform processing described above, such as by executing instructions stored in memory 1030. The processing circuitry 1010 in this regard may implement certain functional means, units, or modules.

Figure 5:
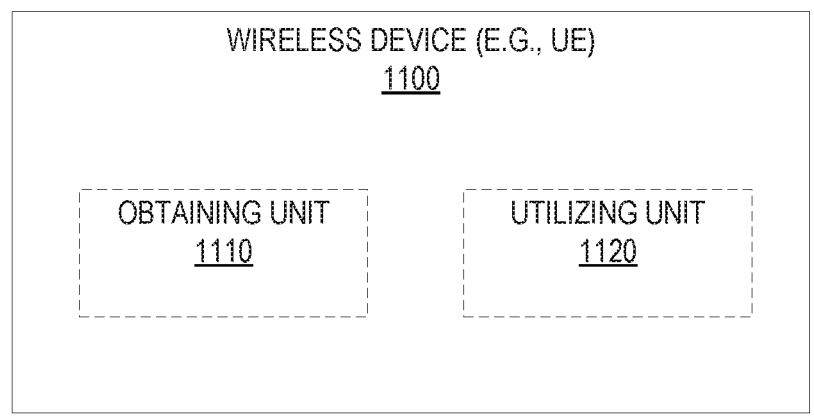
FIG. 5 is a block diagram of a user equipment according to other embodiments.
Figure 8:
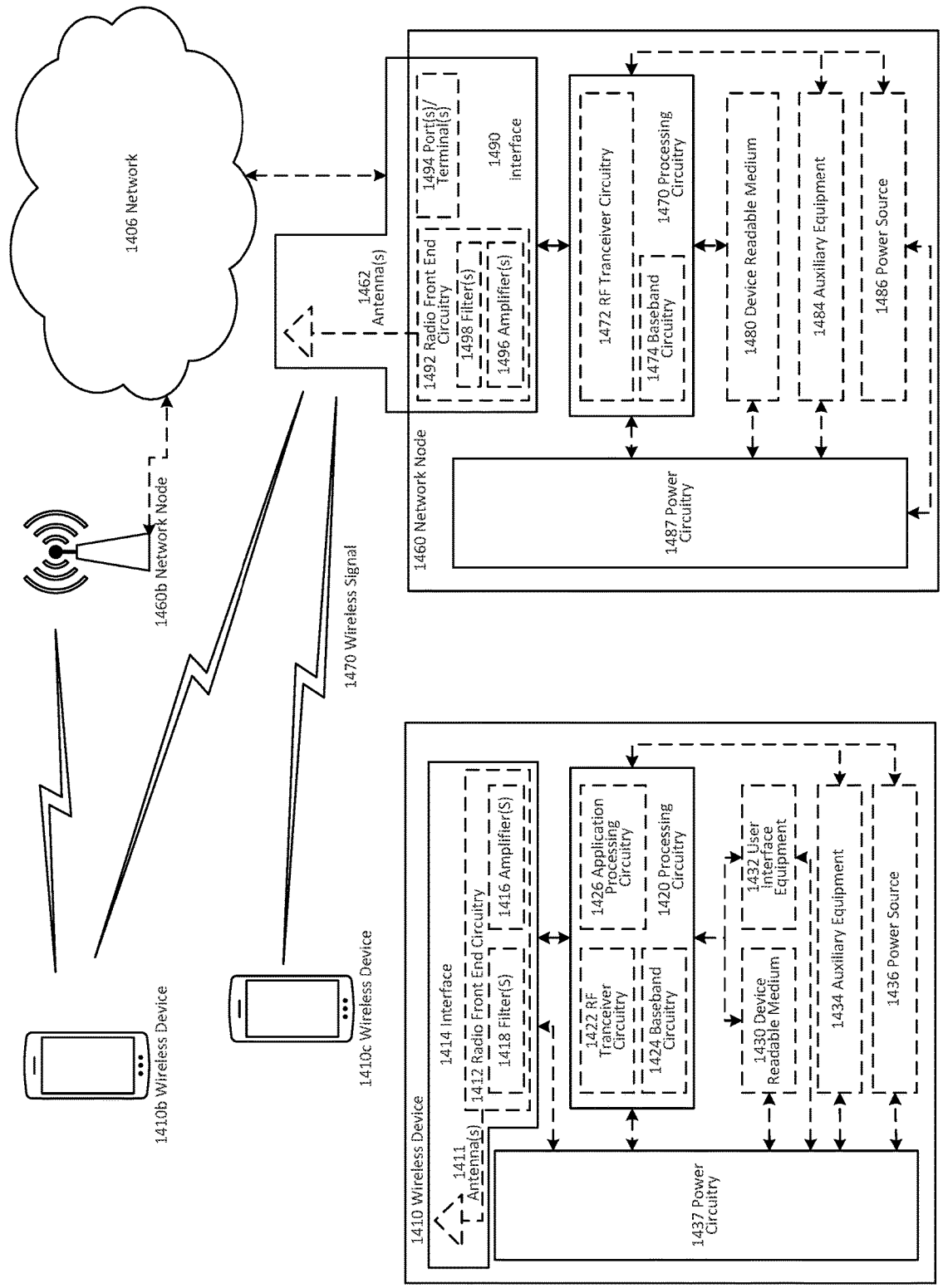
FIG. 8 is a block diagram of a wireless communication network according to some embodiments.

FIG. 5 illustrates a schematic block diagram of an UE 1100 in a wireless network according to still other embodiments (for example, the wireless network shown in FIG. 8). As shown, the UE 1100 implements various functional means, units, or modules, e.g., via the processing circuitry 1010 in FIG. 10 and/or via software code. These functional means, units, or modules, e.g., for implementing the method(s) herein, include for instance, obtaining unit 1110 configured to perform the aspects of block 302 of FIG. 3, and utilizing unit 1110 configured to perform the aspects of block 304 of FIG. 3 (though other aspects described throughout can be performed by components, units, etc forming the processing circuitry).

Figure 6:
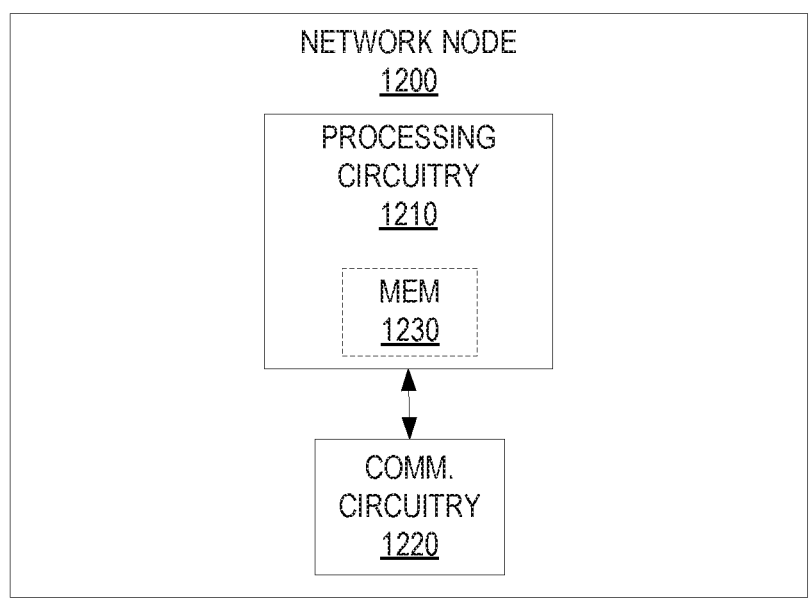
FIG. 6 is a block diagram of a network node according to some embodiments.

FIG. 6 illustrates a network node 1200 as implemented in accordance with one or more embodiments. As shown, the network node 1200 includes processing circuitry 1210 and communication circuitry 1220. The communication circuitry 1220 is configured to transmit and/or receive information to and/or from one or more other nodes, e.g., via any communication technology. The processing circuitry 1210 is configured to perform processing described above, such as by executing instructions stored in memory 1230. The processing circuitry 1210 in this regard may implement certain functional means, units, or modules.

Figure 7:
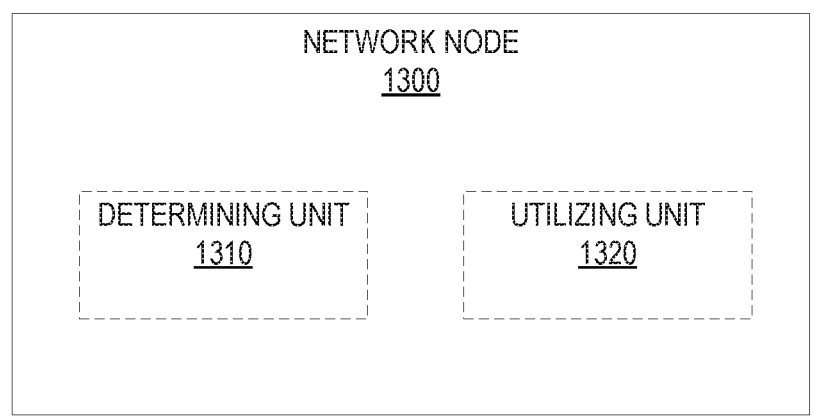
FIG. 7 is a block diagram of a network node according to other embodiments.

FIG. 7 illustrates a schematic block diagram of a network node 1300 in a wireless network according to still other embodiments (for example, the wireless network shown in FIG. 8). As shown, the network node 1300 implements various functional means, units, or modules, e.g., via the processing circuitry 1210 in FIG. 6 and/or via software code. These functional means, units, or modules, e.g., for implementing the method(s) herein, include for instance determining unit 1310 configured to perform the aspects of block 202 of FIG. 2, and utilizing unit 1320 configured to perform the aspects of block 204 of FIG. 2 (though other aspects described throughout can be performed by components, units, etc forming the processing circuitry).

Those skilled in the art will also appreciate that embodiments herein further include corresponding computer programs.

A computer program comprises instructions which, when executed on at least one processor of an apparatus, cause the apparatus to carry out any of the respective processing described above. A computer program in this regard may comprise one or more code modules corresponding to the means or units described above.

Embodiments further include a carrier containing such a computer program. This carrier may comprise one of an electronic signal, optical signal, radio signal, or computer readable storage medium.

In this regard, embodiments herein also include a computer program product stored on a non-transitory computer readable (storage or recording) medium and comprising instructions that, when executed by a processor of an apparatus, cause the apparatus to perform as described above.

Embodiments further include a computer program product comprising program code portions for performing the steps of any of the embodiments herein when the computer program product is executed by a computing device. This computer program product may be stored on a computer readable recording medium.

Additional embodiments will now be described. At least some of these embodiments may be described as applicable in certain contexts and/or wireless network types for illustrative purposes, but the embodiments are similarly applicable in other contexts and/or wireless network types not explicitly described.

Although the subject matter described herein may be implemented in any appropriate type of system using any suitable components, the embodiments disclosed herein are described in relation to a wireless network, such as the example wireless network illustrated in FIG. 8. For simplicity, the wireless network of FIG. 8 only depicts network 1406, network nodes 1460 and 1460b, and WDs 1410, 1410b, and 1410c. In practice, a wireless network may further include any additional elements suitable to support communication between UEs or between a UE and another communication device, such as a landline telephone, a service provider, or any other network node or end device, Of the illustrated components, network node 1460 and UE (WD) 1410 are depicted with additional detail. The wireless network may provide communication and other types of services to one or more UEs to facilitate the UEs' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), Narrowband Internet of Things (NB-IoT), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 1406 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 1460 and WD 1410 comprise various components described in more detail below. These components work together in order to provide network node and/or UE functionality, such as providing wireless connections in a wireless network. In different embodiments, the wireless network may comprise any number of wired or wireless networks, network nodes, base stations, controllers, UEs, relay stations, and/or any other components or systems that may facilitate or participate in the communication of data and/or signals whether via wired or wireless connections.

As used herein, network node refers to equipment capable, configured, arranged and/or operable to communicate directly or indirectly with a UE and/or with other network nodes or equipment in the wireless network to enable and/or provide wireless access to the UE and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pica base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a UE with access to the wireless network or to provide some service to a UE that has accessed the wireless network.

In FIG. 8, network node 1460 includes processing circuitry 1470, device readable medium 1480, interface 1490, auxiliary equipment 1484, power source 1486, power circuitry 1487, and antenna 1462. Although network node 1460 illustrated in the example wireless network of FIG. 8 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 1460 are depicted as single boxes located within a larger box, or nested within multiple boxes, in practice, a network node may comprise multiple different physical components that make up a single illustrated component (e.g., device readable medium 1480 may comprise multiple separate hard drives as well as multiple RAM modules).

Similarly, network node 1460 may be composed of multiple physically separate components (e.g., a NodeB component and a RNC component, or a BTS component and a BSC component, etc.), which may each have their own respective components. In certain scenarios in which network node 1460 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 1460 may be configured to support multiple radio access technologies (RATs). In such embodiments, some components may be duplicated (e.g., separate device readable medium 1480 for the different RATs) and some components may be reused (e.g., the same antenna 1462 may be shared by the RATs). Network node 1460 may also include multiple sets of the various illustrated components for different wireless technologies integrated into network node 1460, such as, for example, GSM, WCDMA, LTE, NR, WiFi, or Bluetooth wireless technologies. These wireless technologies may be integrated into the same or different chip or set of chips and other components within network node 1460.

Processing circuitry 1470 is configured to perform any determining, calculating, or similar operations (e.g., certain obtaining operations) described herein as being provided by a network node. These operations performed by processing circuitry 1470 may include processing information obtained by processing circuitry 1470 by, for example, converting the obtained information into other information, comparing the obtained information or converted information to information stored in the network node, and/or performing one or more operations based on the obtained information or converted information, and as a result of said processing making a determination.

Processing circuitry 1470 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 1460 components, such as device readable medium 1480, network node 1460 functionality. For example, processing circuitry 1470 may execute instructions stored in device readable medium 1480 or in memory within processing circuitry 1470. Such functionality may include providing any of the various wireless features, functions, or benefits discussed herein. In some embodiments, processing circuitry 1470 may include a system on a chip (Sac).

In some embodiments, processing circuitry 1470 may include one or more of radio frequency (RF) transceiver circuitry 1472 and baseband processing circuitry 1474. In some embodiments, radio frequency (RF) transceiver circuitry 1472 and baseband processing circuitry 1474 may be on separate chips (or sets of chips), boards, or units, such as radio units and digital units. In alternative embodiments, part or all of RF transceiver circuitry 1472 and baseband processing circuitry 1474 may be on the same chip or set of chips, boards, or units In certain embodiments, some or all of the functionality described herein as being provided by a network node, base station, eNB or other such network device may be performed by processing circuitry 1470 executing instructions stored on device readable medium 1480 or memory within processing circuitry 1470. In alternative embodiments, some or all of the functionality may be provided by processing circuitry 1470 without executing instructions stored on a separate or discrete device readable medium, such as in a hard-wired manner. In any of those embodiments, whether executing instructions stored on a device readable storage medium or not, processing circuitry 1470 can be configured to perform the described functionality. The benefits provided by such functionality are not limited to processing circuitry 1470 alone or to other components of network node 1460, but are enjoyed by network node 1460 as a whole, and/or by end users and the wireless network generally.

Device readable medium 1480 may comprise any form of a volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 1470. Device readable medium 1480 may store any suitable instructions, data or information, including a computer program, software, an application including one or more of logic, rules, code, tables, etc. and/or other instructions capable of being executed by processing circuitry 1470 and, utilized by network node 1460. Device readable medium 1480 may be used to store any calculations made by processing circuitry 1470 and/or any data received via interface 1490. In some embodiments, processing circuitry 1470 and device readable medium 1480 may be considered to be integrated.

Interface 1490 is used in the wired or wireless communication of signalling and/or data between network node 1460, network 1406, and/or WDs 1410. As illustrated, interface 1490 comprises port(s)/terminal(s) 1494 to send and receive data, for example to and from network 1406 over a wired connection. Interface 1490 also includes radio front end circuitry 1492 that may be coupled to, or in certain embodiments a part of, antenna 1462. Radio front end circuitry 1492 comprises filters 1498 and amplifiers 1496. Radio front end circuitry 1492 may be connected to antenna 1462 and processing circuitry 1470. Radio front end circuitry may be configured to condition signals communicated between antenna 1462 and processing circuitry 1470. Radio front end circuitry 1492 may receive digital data that is to be sent out to other network nodes or WDs via a wireless connection. Radio front end circuitry 1492 may convert the digital data into a radio signal having the appropriate channel and bandwidth parameters using a combination of filters 1498 and/or amplifiers 1496. The radio signal may then be transmitted via antenna 1462. Similarly, when receiving data, antenna 1462 may collect radio signals which are then converted into digital data by radio front end circuitry 1492. The digital data may be passed to processing circuitry 1470. In other embodiments, the interface may comprise different components and/or different combinations of components.

In certain alternative embodiments, network node 1460 may not include separate radio front end circuitry 1492, instead, processing circuitry 1470 may comprise radio front end circuitry and may be connected to antenna 1462 without separate radio front end circuitry 1492. Similarly, in some embodiments, all or some of RF transceiver circuitry 1472 may be considered a part of interface 1490. In still other embodiments, interface 1490 may include one or more ports or terminals 1494, radio front end circuitry 1492, and RF transceiver circuitry 1472, as part of a radio unit (not shown), and interface 1490 may communicate with baseband processing circuitry 1474, which is part of a digital unit (not shown).

Antenna 1462 may include one or more antennas, or antenna arrays, configured to send and/or receive wireless signals. Antenna 1462 may be coupled to radio front end circuitry 1490 and may be any type of antenna capable of transmitting and receiving data and/or signals wirelessly. In some embodiments, antenna 1462 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 1462 may be separate from network node 1460 and may be connectable to network node 1460 through an interface or port.

Antenna 1462, interface 1490, and/or processing circuitry 1470 may be configured to perform any receiving operations and/or certain obtaining operations described herein as being performed by a network node. Any information, data and/or signals may be received from a UE, another network node and/or any other network equipment. Similarly, antenna 1462, interface 1490, and/or processing circuitry 1470 may be configured to perform any transmitting operations described herein as being performed by a network node. Any information, data and/or signals may be transmitted to a UE, another network node and/or any other network equipment.

Power circuitry 1487 may comprise, or be coupled to, power management circuitry and is configured to supply the components of network node 1460 with power for performing the functionality described herein. Power circuitry 1487 may receive power from power source 1486. Power source 1486 and/or power circuitry 1487 may be configured to provide power to the various components of network node 1460 in a form suitable for the respective components (e.g., at a voltage and current level needed for each respective component). Power source 1486 may either be included in, or external to, power circuitry 1487 and/or network node 1460. For example, network node 1460 may be connectable to an external power source (e.g., an electricity outlet) via an input circuitry or interface such as an electrical cable, whereby the external power source supplies power to power circuitry 1487. As a further example, power source 1486 may comprise a source of power in the form of a battery or battery pack which is connected to, or integrated in, power circuitry 1487. The battery may provide backup power should the external power source fail. Other types of power sources, such as photovoltaic devices, may also be used.

Alternative embodiments of network node 1460 may include additional components beyond those shown in FIG. 8 that may be responsible for providing certain aspects of the network node's functionality, including any of the functionality described herein and/or any functionality necessary to support the subject matter described herein. For example, network node 1460 may include user interface equipment to allow input of information into network node 1460 and to allow output of information from network node 1460. This may allow a user to perform diagnostic, maintenance, repair, and other administrative functions for network node 1460.

As used herein, UE (WD) refers to a device capable, configured, arranged and/or operable to communicate wirelessly with network nodes and/or other UEs. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band Internet of things (NB-IoT) standard, Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, UE 1410 includes antenna 1411, interface 1414, processing circuitry 1420, device readable medium 1430, user interface equipment 1432, auxiliary equipment 1434, power source 1436 and power circuitry 1437. WD 1410 may include multiple sets of one or more of the illustrated components for different wireless technologies supported by WD 1410, such as, for example, GSM, WCDMA, LTE, NR, WiFi, WiMAX, NB-IoT, or Bluetooth wireless technologies, just to mention a few. These wireless technologies may be integrated into the same or different chips or set of chips as other components within WD 1410.

Antenna 1411 may include one or more antennas or antenna arrays, configured to send and/or receive wireless signals, and is connected to interface 1414. In certain alternative embodiments, antenna 1411 may be separate from WD 1410 and be connectable to WD 1410 through an interface or port. Antenna 1411, interface 1414, and/or processing circuitry 1420 may be configured to perform any receiving or transmitting operations described herein as being performed by a WD. Any information, data and/or signals may be received from a network node and/or another WD. In some embodiments, radio front end circuitry and/or antenna 1411 may be considered an interface.

As illustrated, interface 1414 comprises radio front end circuitry 1412 and antenna 1411. Radio front end circuitry 1412 comprise one or more filters 1418 and amplifiers 1416. Radio front end circuitry 1414 is connected to antenna 1411 and processing circuitry 1420, and is configured to condition signals communicated between antenna 1411 and processing circuitry 1420. Radio front end circuitry 1412 may be coupled to or a part of antenna 1411. In some embodiments, WD 1410 may not include separate radio front end circuitry 1412; rather, processing circuitry 1420 may comprise radio front end circuitry and may be connected to antenna 1411. Similarly, in some embodiments, some or all of RF transceiver circuitry 1422 may be considered a part of interface 1414. Radio front end circuitry 1412 may receive digital data that is to be sent out to other network nodes or WDs via a wireless connection. Radio front end circuitry 1412 may convert the digital data into a radio signal having the appropriate channel and bandwidth parameters using a combination of filters 1418 and/or amplifiers 1416. The radio signal may then be transmitted via antenna 1411. Similarly, when receiving data, antenna 1411 may collect radio signals which are then converted into digital data by radio front end circuitry 1412. The digital data may be passed to processing circuitry 1420. In other embodiments, the interface may comprise different components and/or different combinations of components.

Processing circuitry 1420 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 1410 components, such as device readable medium 1430, WD 1410 functionality. Such functionality may include providing any of the various wireless features or benefits discussed herein. For example, processing circuitry 1420 may execute instructions stored in device readable medium 1430 or in memory within processing circuitry 1420 to provide the functionality disclosed herein.

As illustrated, processing circuitry 1420 includes one or more of RF transceiver circuitry 1422, baseband processing circuitry 1424, and application processing circuitry 1426. In other embodiments, the processing circuitry may comprise different components and/or different combinations of components. In certain embodiments processing circuitry 1420 of WD 1410 may comprise a SOC. In some embodiments, RF transceiver circuitry 1422, baseband processing circuitry 1424, and application processing circuitry 1426 may be on separate chips or sets of chips. In alternative embodiments, part or all of baseband processing circuitry 1424 and application processing circuitry 1426 may be combined into one chip or set of chips, and RF transceiver circuitry 1422 may be on a separate chip or set of chips. In still alternative embodiments, part or all of RF transceiver circuitry 1422 and baseband processing circuitry 1424 may be on the same chip or set of chips, and application processing circuitry 1426 may be on a separate chip or set of chips. In yet other alternative embodiments, part or all of RF transceiver circuitry 1422, baseband processing circuitry 1424, and application processing circuitry 1426 may be combined in the same chip or set of chips. In some embodiments, RF transceiver circuitry 1422 may be a part of interface 1414. RF transceiver circuitry 1422 may condition RE signals for processing circuitry 1420.

In certain embodiments, some or all of the functionality described herein as being performed by a WD may be provided by processing circuitry 1420 executing instructions stored on device readable medium 1430, which in certain embodiments may be a computer-readable storage medium. In alternative embodiments, some or all of the functionality may be provided by processing circuitry 1420 without executing instructions stored on a separate or discrete device readable storage medium, such as in a hard-wired manner. In any of those particular embodiments, whether executing instructions stored on a device readable storage medium or not, processing circuitry 1420 can be configured to perform the described functionality. The benefits provided by such functionality are not limited to processing circuitry 1420 alone or to other components of WD 1410, but are enjoyed by WD 1410 as a whole, and/or by end users and the wireless network generally.

Processing circuitry 1420 may be configured to perform any determining, calculating, or similar operations (e.g., certain obtaining operations) described herein as being performed by a WD. These operations, as performed by processing circuitry 1420, may include processing information obtained by processing circuitry 1420 by, for example, converting the obtained information into other information, comparing the obtained information or converted information to information stored by WD 1410, and/or performing one or more operations based on the obtained information or converted information, and as a result of said processing making a determination.

Device readable medium 1430 may be operable to store a computer program, software, an application including one or more of logic, rules, code, tables, etc. and/or other instructions capable of being executed by processing circuitry 1420. Device readable medium 1430 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 1420. In some embodiments, processing circuitry 1420 and device readable medium 1430 may be considered to be integrated.

User interface equipment 1432 may provide components that allow for a human user to interact with WD 1410. Such interaction may be of many forms, such as visual, audial, tactile, etc. User interface equipment 1432 may be operable to produce output to the user and to allow the user to provide input to WD 1410. The type of interaction may vary depending on the type of user interface equipment 1432 installed in WD 1410, For example, if WD 1410 is a smart phone, the interaction may be via a touch screen; if WD 1410 is a smart meter, the interaction may be through a screen that provides usage (e.g., the number of gallons used) or a speaker that provides an audible alert (e.g., if smoke is detected). User interface equipment 1432 may include input interfaces, devices and circuits, and output interfaces, devices and circuits. User interface equipment 1432 is configured to allow input of information into WD 1410, and is connected to processing circuitry 1420 to allow processing circuitry 1420 to process the input information. User interface equipment 1432 may include, for example, a microphone, a proximity or other sensor, keys/buttons, a touch display, one or more cameras, a USB port, or other input circuitry. User interface equipment 1432 is also configured to allow output of information from WD 1410, and to allow processing circuitry 1420 to output information from WD 1410, User interface equipment 1432 may include, for example, a speaker, a display, vibrating circuitry, a USB port, a headphone interface, or other output circuitry. Using one or more input and output interfaces, devices, and circuits, of user interface equipment 1432, WD 1410 may communicate with end users and/or the wireless network, and allow them to benefit from the functionality described herein.

Auxiliary equipment 1434 is operable to provide more specific functionality which may not be generally performed by WDs. This may comprise specialized sensors for doing measurements for various purposes, interfaces for additional types of communication such as wired communications etc. The inclusion and type of components of auxiliary equipment 1434 may vary depending on the embodiment and/or scenario.

Power source 1436 may, in some embodiments, be in the form of a battery or battery pack. Other types of power sources, such as an external power source (e.g., an electricity outlet), photovoltaic devices or power cells, may also be used. WD 1410 may further comprise power circuitry 1437 for delivering power from power source 1436 to the various parts of WD 1410 which need power from power source 1436 to carry out any functionality described or indicated herein. Power circuitry 1437 may in certain embodiments comprise power management circuitry. Power circuitry 1437 may additionally or alternatively be operable to receive power from an external power source; in which case WD 1410 may be connectable to the external power source (such as an electricity outlet) via input circuitry or an interface such as an electrical power cable. Power circuitry 1437 may also in certain embodiments be operable to deliver power from an external power source to power source 1436. This may be, for example, for the charging of power source 1436. Power circuitry 1437 may perform any formatting, converting, or other modification to the power from power source 1436 to make the power suitable for the respective components of WD 1410 to which power is supplied.

Figure 9:
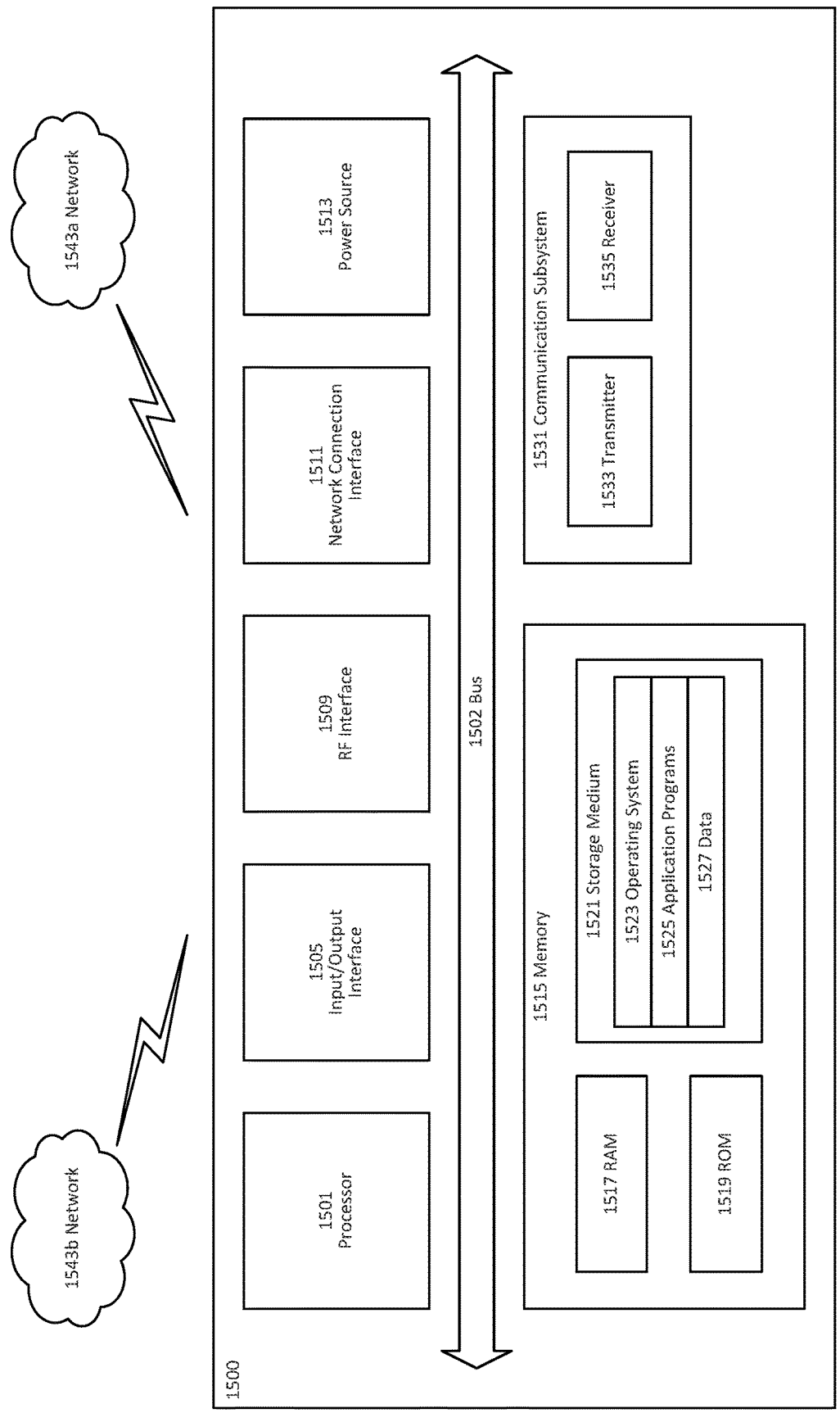
FIG. 9 is a block diagram of a user equipment according to some embodiments.

FIG. 9 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 15200 may be any UE identified by the 3$^{rd}$ Generation Partnership Project (3GPP), including a NB-IoT UE, a machine type communication (MTC) UE, and/or an enhanced MTC (eMTC) UE. UE 1500, as illustrated in FIG. 9, is one example of a WD configured for communication in accordance with one or more communication standards promulgated by the 3$^{rd}$ Generation Partnership Project (3GPP), such as 3GPP's GSM, UMTS, LTE, and/or 5G standards. As mentioned previously, the term WD and UE may be used interchangeable. Accordingly, although FIG. 9 is a UE, the components discussed herein are equally applicable to a WD, and vice-versa.

In FIG. 9, UE 1500 includes processing circuitry 1501 that is operatively coupled to input/output interface 1505, radio frequency (RF) interface 1509, network connection interface 1511, memory 1515 including random access memory (RAM) 1517, read-only memory (ROM) 1519, and storage medium 1521 or the like, communication subsystem 1531, power source 1533, and/or any other component, or any combination thereof. Storage medium 1521 includes operating system 1523, application program 1525, and data 1527. In other embodiments, storage medium 1521 may include other similar types of information. Certain UEs may utilize all of the components shown in FIG. 9, or only a subset of the components. The level of integration between the components may vary from one UE to another UE. Further, certain UEs may contain multiple instances of a component, such as multiple processors, memories, transceivers, transmitters, receivers, etc.

In FIG. 9, processing circuitry 1501 may be configured to process computer instructions and data. Processing circuitry 1501 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 1501 may include two central processing units (CPUs). Data may be information in a form suitable for use by a computer.

In the depicted embodiment, input/output interface 1505 may be configured to provide a communication interface to an input device, output device, or input and output device. UE 1500 may be configured to use an output device via input/output interface 1505. An output device may use the same type of interface port as an input device. For example, a USB port may be used to provide input to and output from UE 1500. The output device may be a speaker, a sound card, a video card, a display, a monitor, a printer, an actuator, an emitter, a smartcard, another output device, or any combination thereof. UE 1500 may be configured to use an input device via input/output interface 1505 to allow a user to capture information into UE 1500. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 9, RF interface 1509 may be configured to provide a communication interface to RF components such as a transmitter, a receiver, and an antenna. Network connection interface 1511 may be configured to provide a communication interface to network 1543a. Network 1543a may encompass wired and/or wireless networks such as a local-area network (LAN), a wide-area network (WAN), a computer network, a wireless network, a telecommunications network, another like network or any combination thereof. For example, network 1543a may comprise a Wi-Fi network. Network connection interface 1511 may be configured to include a receiver and a transmitter interface used to communicate with one or more other devices over a communication network according to one or more communication protocols, such as Ethernet, TCP/IP, SONET, ATM, or the like. Network connection interface 1511 may implement receiver and transmitter functionality appropriate to the communication network links (e.g., optical, electrical, and the like). The transmitter and receiver functions may share circuit components, software or firmware, or alternatively may be implemented separately.

RAM 1517 may be configured to interface via bus 1502 to processing circuitry 1501 to provide storage or caching of data or computer instructions during the execution of software programs such as the operating system, application programs, and device drivers. ROM 1519 may be configured to provide computer instructions or data to processing circuitry 1501. For example, ROM 1519 may be configured to store invariant low-level system code or data for basic system functions such as basic input and output (I/O), startup, or reception of keystrokes from a keyboard that are stored in a non-volatile memory, Storage medium 1521 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 1521 may be configured to include operating system 1523, application program 1525 such as a web browser application, a widget or gadget engine or another application, and data file 1527. Storage medium 1521 may store, for use by UE 1500, any of a variety of various operating systems or combinations of operating systems.

Storage medium 1521 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 1521 may allow UE 1500 to access computer-executable instructions, application programs or the like, stored on transitory or non-transitory memory media, to off-load data, or to upload data. An article of manufacture, such as one utilizing a communication system may be tangibly embodied in storage medium 1521, which may comprise a device readable medium.

In FIG. 9, processing circuitry 1501 may be configured to communicate with network 1543b using communication subsystem 1531. Network 1543a and network 1543b may be the same network or networks or different network or networks. Communication subsystem 1531 may be configured to include one or more transceivers used to communicate with network 1543b. For example, communication subsystem 1531 may be configured to include one or more transceivers used to communicate with one or more remote transceivers of another device capable of wireless communication such as another WD, UE, or base station of a radio access network (RAN) according to one or more communication protocols, such as IEEE 802.15, CDMA, WCDMA, GSM, LTE, UTRAN, WiMax, or the like. Each transceiver may include transmitter 1533 and/or receiver 1535 to implement transmitter or receiver functionality, respectively, appropriate to the RAN links (e.g., frequency allocations and the like). Further, transmitter 1533 and receiver 1535 of each transceiver may share circuit components, software or firmware, or alternatively may be implemented separately.

In the illustrated embodiment, the communication functions of communication subsystem 1531 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 1531 may include cellular communication, Wi-Fi communication, Bluetooth communication, and GPS communication. Network 1543b may encompass wired and/or wireless networks such as a local-area network (LAN), a wide-area network (WAN), a computer network, a wireless network, a telecommunications network, another like network or any combination thereof. For example, network 1543b may be a cellular network, a Wi-Fi network, and/or a near-field network, Power source 1513 may be configured to provide alternating current (AC) or direct current (DC) power to components of UE 1500.

The features, benefits and/or functions described herein may be implemented in one of the components of UE 1500 or partitioned across multiple components of UE 1500. Further, the features, benefits, and/or functions described herein may be implemented in any combination of hardware, software or firmware. In one example, communication subsystem 1531 may be configured to include any of the components described herein. Further, processing circuitry 1501 may be configured to communicate with any of such components over bus 1502. In another example, any of such components may be represented by program instructions stored in memory that when executed by processing circuitry 1501 perform the corresponding functions described herein. In another example, the functionality of any of such components may be partitioned between processing circuitry 1501 and communication subsystem 1531. In another example, the non-computationally intensive functions of any of such components may be implemented in software or firmware and the computationally intensive functions may be implemented in hardware.

Figure 10:
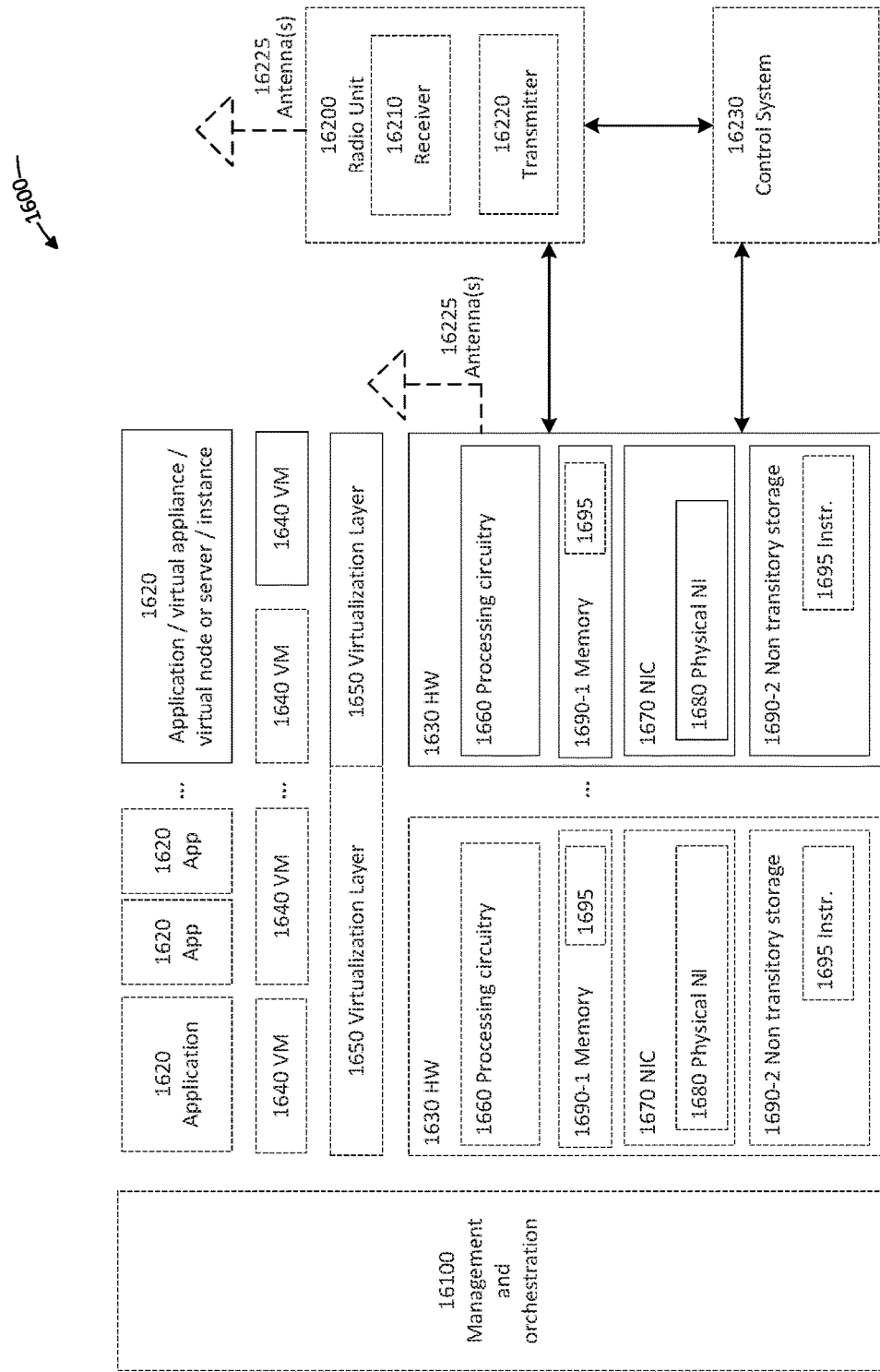
FIG. 10 is a block diagram of a virtualization environment according to some embodiments.

FIG. 10 is a schematic block diagram illustrating a virtualization environment 1600 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a UE or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 1600 hosted by one or more of hardware nodes 1630. Further, in embodiments in which the virtual node is not a radio access node or does not require radio connectivity (e.g., a core network node), then the network node may be entirely virtualized.

The functions may be implemented by one or more applications 1620 (which may alternatively be called software instances, virtual appliances, network functions, virtual nodes, virtual network functions, etc.) operative to implement some of the features, functions, and/or benefits of some of the embodiments disclosed herein. Applications 1620 are run in virtualization environment 1600 which provides hardware 1630 comprising processing circuitry 1660 and memory 1690. Memory 1690 contains instructions 1695 executable by processing circuitry 1660 whereby application 1620 is operative to provide one or more of the features, benefits, and/or functions disclosed herein.

Virtualization environment 1600, comprises general-purpose or special-purpose network hardware devices 1630 comprising a set of one or more processors or processing circuitry 1660, which may be commercial off-the-shelf (COTS) processors, dedicated Application Specific Integrated Circuits (ASICs), or any other type of processing circuitry including digital or analog hardware components or special purpose processors. Each hardware device may comprise memory 1690-1 which may be non-persistent memory for temporarily storing instructions 1695 or software executed by processing circuitry 1660. Each hardware device may comprise one or more network interface controllers (NICs) 1670, also known as network interface cards, which include physical network interface 1680. Each hardware device may also include non-transitory, persistent, machine-readable storage media 1690-2 having stored therein software 1695 and/or instructions executable by processing circuitry 1660. Software 1695 may include any type of software including software for instantiating one or more virtualization layers 1650 (also referred to as hypervisors), software to execute virtual machines 1640 as well as software allowing it to execute functions, features and/or benefits described in relation with some embodiments described herein.

Virtual machines 1640, comprise virtual processing, virtual memory, virtual networking or interface and virtual storage, and may be run by a corresponding virtualization layer 1650 or hypervisor. Different embodiments of the instance of virtual appliance 1620 may be implemented on one or more of virtual machines 1640, and the implementations may be made in different ways.

During operation, processing circuitry 1660 executes software 1695 to instantiate the hypervisor or virtualization layer 1650, which may sometimes be referred to as a virtual machine monitor (VIM), Virtualization layer 1650 may present a virtual operating platform that appears like networking hardware to virtual machine 1640.

As shown in FIG. 10, hardware 1630 may be a standalone network node with generic or specific components. Hardware 1630 may comprise antenna 16225 and may implement some functions via virtualization. Alternatively, hardware 1630 may be part of a larger cluster of hardware (e.g, such as in a data center or customer premise equipment (CPE)) where many hardware nodes work together and are managed via management and orchestration (MANO) 16100, which, among others, oversees lifecycle management of applications 1620.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 1640 may be a software implementation of a physical machine that runs programs as if they were executing on a physical, non-virtualized machine. Each of virtual machines 1640, and that part of hardware 1630 that executes that virtual machine, be it hardware dedicated to that virtual machine and/or hardware shared by that virtual machine with others of the virtual machines 1640, forms a separate virtual network elements (VNE).

Still in the context of NFV, Virtual Network Function (VNF) is responsible for handling specific network functions that run in one or more virtual machines 1640 on top of hardware networking infrastructure 1630 and corresponds to application 1620 in FIG. 10.

In some embodiments, one or more radio units 16200 that each include one or more transmitters 16220 and one or more receivers 16210 may be coupled to one or more antennas 16225. Radio units 16200 may communicate directly with hardware nodes 1630 via one or more appropriate network interfaces and may be used in combination with the virtual components to provide a virtual node with radio capabilities, such as a radio access node or a base station.

In some embodiments, some signalling can be effected with the use of control system 16230 which may alternatively be used for communication between the hardware nodes 1630 and radio units 16200.

Figure 11:
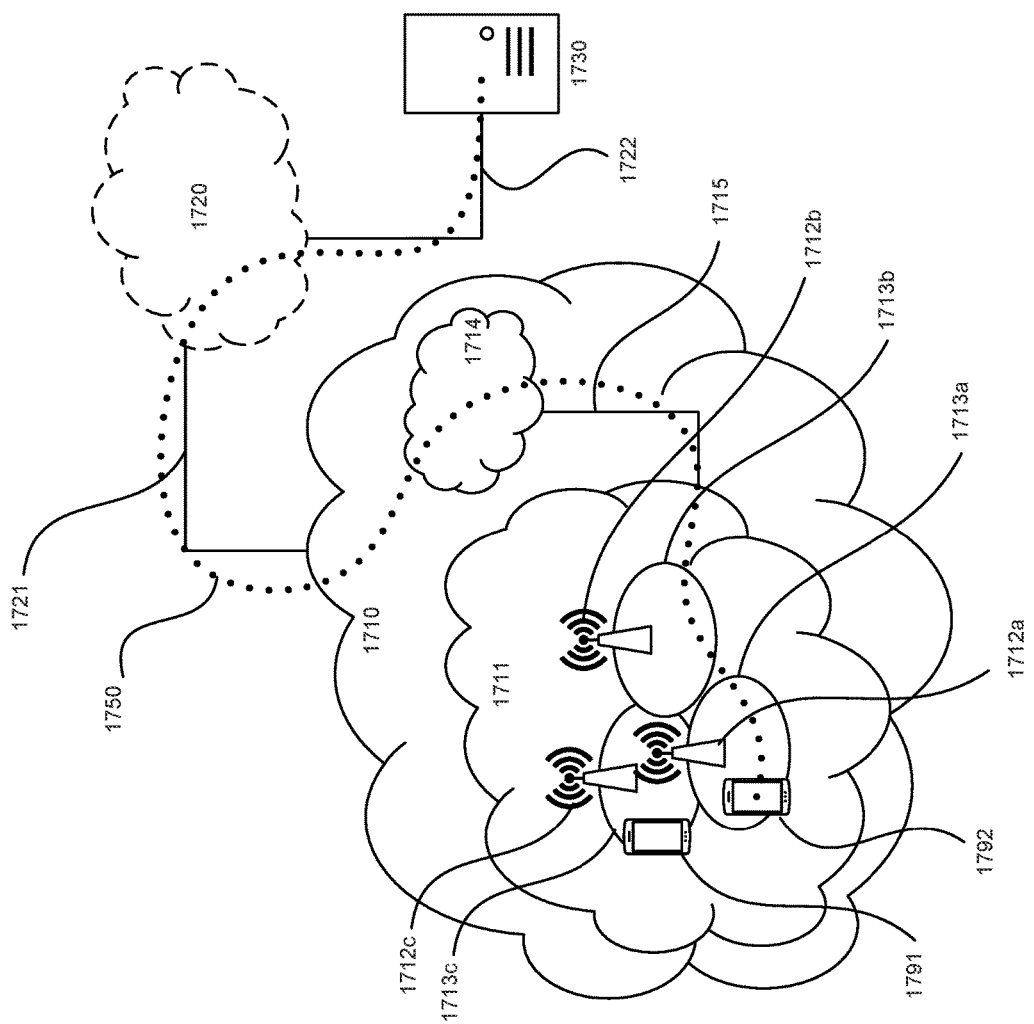
FIG. 11 is a block diagram of a communication network with a host computer according to some embodiments.

FIG. 11 illustrates a telecommunication network connected via an intermediate network to a host computer in accordance with some embodiments. In particular, with reference to FIG. 11, in accordance with an embodiment, a communication system includes telecommunication network 1710, such as a 3GPP-type cellular network, which comprises access network 1711, such as a radio access network, and core network 1714. Access network 1711 comprises a plurality of base stations 1712a, 1712b, 1712c, such as NBs, eNBs, gNBs or other types of wireless access points, each defining a corresponding coverage area 1713a, 1713b, 1713c. Each base station 1712a, 1712b, 1712c is connectable to core network 1714 over a wired or wireless connection 1715. A first UE 1791 located in coverage area 1713c is configured to wirelessly connect to, or be paged by, the corresponding base station 1712c. A second UE 1792 in coverage area 1713a is wirelessly connectable to the corresponding base station 1712a. While a plurality of UEs 1791, 1792 are illustrated in this example, the disclosed embodiments are equally applicable to a situation where a sole UE is in the coverage area or where a sole UE is connecting to the corresponding base station 1712.

Telecommunication network 1710 is itself connected to host computer 1730, which may be embodied in the hardware and/or software of a standalone server, a cloud-implemented server, a distributed server or as processing resources in a server farm. Host computer 1730 may be under the ownership or control of a service provider, or may be operated by the service provider or on behalf of the service provider. Connections 1721 and 1722 between telecommunication network 1710 and host computer 1730 may extend directly from core network 1714 to host computer 1730 or may go via an optional intermediate network 1720. Intermediate network 1720 may be one of, or a combination of more than one of, a public, private or hosted network; intermediate network 1720, if any, may be a backbone network or the Internet; in particular, intermediate network 1720 may comprise two or more sub-networks (not shown).

The communication system of FIG. 11 as a whole enables connectivity between the connected UEs 1791, 1792 and host computer 1730. The connectivity may be described as an over-the-top (OTT) connection 1750. Host computer 1730 and the connected UEs 1791, 1792 are configured to communicate data and/or signaling via OTT connection 1750, using access network 1711, core network 1714, any intermediate network 1720 and possible further infrastructure (not shown) as intermediaries. OTT connection 1750 may be transparent in the sense that the participating communication devices through which OTT connection 1750 passes are unaware of routing of uplink and downlink communications. For example, base station 1712 may not or need not be informed about the past routing of an incoming downlink communication with data originating from host computer 1730 to be forwarded (e.g., handed over) to a connected UE 1791. Similarly, base station 1712 need not be aware of the future routing of an outgoing uplink communication originating from the UE 1791 towards the host computer 1730.

Figure 12:
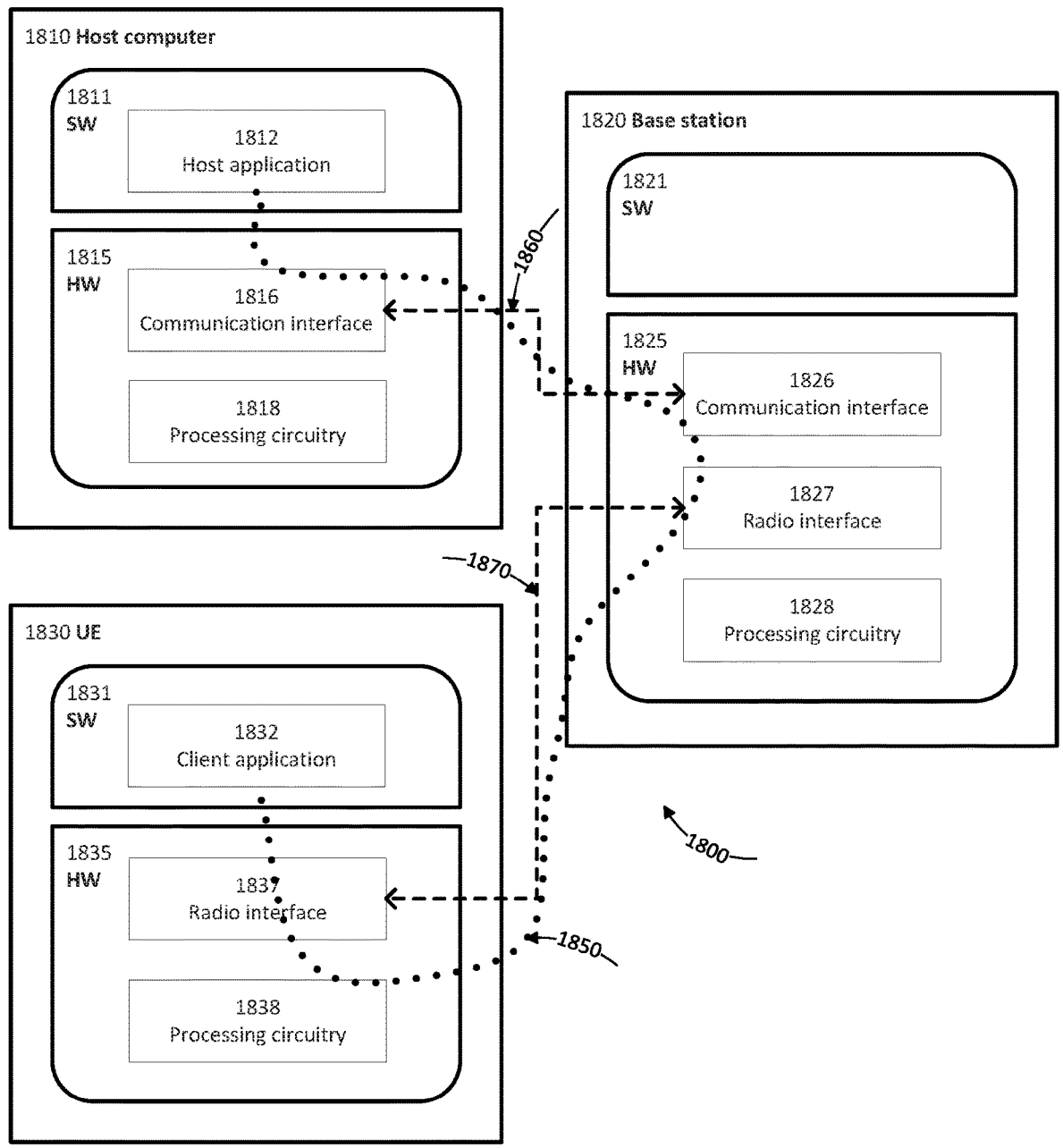
FIG. 12 is a block diagram of a host computer according to some embodiments.

Example implementations, in accordance with an embodiment, of the UE, base station and host computer discussed in the preceding paragraphs will now be described with reference to FIG. 12. FIG. 12 illustrates host computer communicating via a base station with a user equipment over a partially wireless connection in accordance with some embodiments. In communication system 1800, host computer 1810 comprises hardware 1815 including communication interface 1816 configured to set up and maintain a wired or wireless connection with an interface of a different communication device of communication system 1800. Host computer 1810 further comprises processing circuitry 1818, which may have storage and/or processing capabilities. In particular, processing circuitry 1818 may comprise one or more programmable processors, application-specific integrated circuits, field programmable gate arrays or combinations of these (not shown) adapted to execute instructions. Host computer 1810 further comprises software 1811, which is stored in or accessible by host computer 1810 and executable by processing circuitry 1818. Software 1811 includes host application 1812. Host application 1812 may be operable to provide a service to a remote user, such as UE 1830 connecting via OTT connection 1850 terminating at UE 1830 and host computer 1810. In providing the service to the remote user, host application 1812 may provide user data which is transmitted using OTT connection 1850.

Communication system 1800 further includes base station 1820 provided in a telecommunication system and comprising hardware 1825 enabling it to communicate with host computer 1810 and with UE 1830. Hardware 1825 may include communication interface 1826 for setting up and maintaining a wired or wireless connection with an interface of a different communication device of communication system 1800, as well as radio interface 1827 for setting up and maintaining at least wireless connection 1870 with UE 1830 located in a coverage area (not shown in FIG. 12)

served by base station 1820, Communication interface 1826 may be configured to facilitate connection 1860 to host computer 1810. Connection 1860 may be direct or it may pass through a core network (not shown in FIG. 12) of the telecommunication system and/or through one or more intermediate networks outside the telecommunication system. In the embodiment shown, hardware 1825 of base station 1820 further includes processing circuitry 1828, which may comprise one or more programmable processors, application-specific integrated circuits, field programmable gate arrays or combinations of these (not shown) adapted to execute instructions. Base station 1820 further has software 1821 stored internally or accessible via an external connection.

Communication system 1800 further includes UE 1830 already referred to. Its hardware 1835 may include radio interface 1837 configured to set up and maintain wireless connection 1870 with a base station serving a coverage area in which UE 1830 is currently located. Hardware 1835 of UE 1830 further includes processing circuitry 1838, which may comprise one or more programmable processors, application-specific integrated circuits, field programmable gate arrays or combinations of these (not shown) adapted to execute instructions. UE 1830 further comprises software 1831, which is stored in or accessible by UE 1830 and executable by processing circuitry 1838. Software 1831 includes client application 1832. Client application 1832 may be operable to provide a service to a human or non-human user via UE 1830, with the support of host computer 1810. In host computer 1810, an executing host application 1812 may communicate with the executing client application 1832 via OTT connection 1850 terminating at UE 1830 and host computer 1810. In providing the service to the user, client application 1832 may receive request data from host application 1812 and provide user data in response to the request data. OTT connection 1850 may transfer both the request data and the user data. Client application 1832 may interact with the user to generate the user data that it provides.

It is noted that host computer 1810, base station 1820 and UE 1830 illustrated in FIG. 12 may be similar or identical to host computer 1730, one of base stations 1712a, 1712b, 1712c and one of UEs 1791, 1792 of FIG. 11, respectively. This is to say, the inner workings of these entities may be as shown in FIG. 12 and independently, the surrounding network topology may be that of FIG. 11.

In FIG. 12, OTT connection 1850 has been drawn abstractly to illustrate the communication between host computer 1810 and UE 1830 via base station 1820, without explicit reference to any intermediary devices and the precise routing of messages via these devices. Network infrastructure may determine the routing, which it may be configured to hide from UE 1830 or from the service provider operating host computer 1810, or both. While OTT connection 1850 is active, the network infrastructure may further take decisions by which it dynamically changes the routing (e.g., on the basis of load balancing consideration or reconfiguration of the network).

Wireless connection 1870 between UE 1830 and base station 1820 is in accordance with the teachings of the embodiments described throughout this disclosure. One or more of the various embodiments improve the performance of OTT services provided to UE 1830 using OTT connection 1850, in which wireless connection 1870 forms the last segment. More precisely, the teachings of these embodiments may improve the power efficiency and overhead of the system as a whole and thereby provide benefits such as overall system economy, resource and power utilization, and communication speed.

A measurement procedure may be provided for the purpose of monitoring data rate, latency and other factors on which the one or more embodiments improve. There may further be an optional network functionality for reconfiguring OTT connection 1850 between host computer 1810 and UE 1830, in response to variations in the measurement results. The measurement procedure and/or the network functionality for reconfiguring OTT connection 1850 may be implemented in software 1811 and hardware 1815 of host computer 1810 or in software 1831 and hardware 1835 of UE 1830, or both. In embodiments, sensors (not shown) may be deployed in or in association with communication devices through which OTT connection 1850 passes; the sensors may participate in the measurement procedure by supplying values of the monitored quantities exemplified above, or supplying values of other physical quantities from which software 1811, 1831 may compute or estimate the monitored quantities. The reconfiguring of OTT connection 1850 may include message format, retransmission settings, preferred routing etc.; the reconfiguring need not affect base station 1820, and it may be unknown or imperceptible to base station 1820. Such procedures and functionalities may be known and practiced in the art. In certain embodiments, measurements may involve proprietary UE signaling facilitating host computer 1810's measurements of throughput, propagation times, latency and the like. The measurements may be implemented in that software 1811 and 1831 causes messages to be transmitted, in particular empty or 'dummy' messages, using OTT connection 1850 while it monitors propagation times, errors etc.

Figure 13:
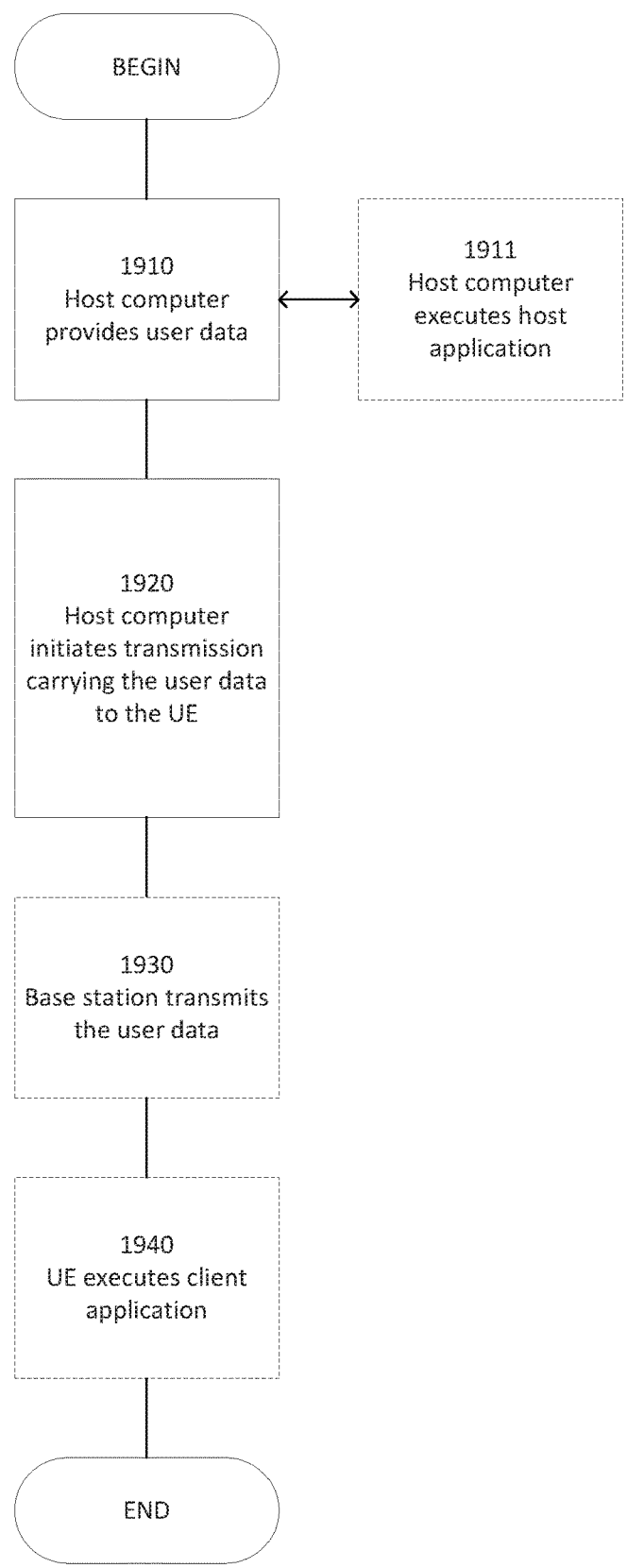
FIG. 13 is a flowchart illustrating a method implemented in a communication system, in accordance with one embodiment.

FIG. 13 is a flowchart illustrating a method implemented in a communication system, in accordance with one embodiment. The communication system includes a host computer, a base station and a UE which may be those described with reference to FIGS. 17 and 18. For simplicity of the present disclosure, only drawing references to FIG. 13 will be included in this section. In step 1910, the host computer provides user data. In substep 1911 (which may be optional) of step 1910, the host computer provides the user data by executing a host application. In step 1920, the host computer initiates a transmission carrying the user data to the UE. In step 1930 (which may be optional), the base station transmits to the UE the user data which was carried in the transmission that the host computer initiated, in accordance with the teachings of the embodiments described throughout this disclosure. In step 1940 (which may also be optional), the UE executes a client application associated with the host application executed by the host computer.

Figure 14:
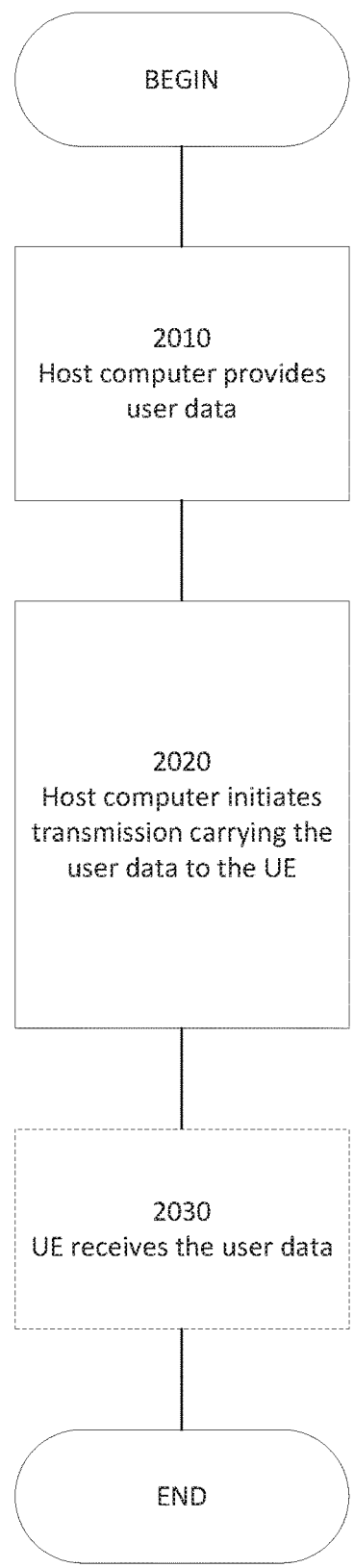
FIG. 14 is a flowchart illustrating a method implemented in a communication system, in accordance with one embodiment.

FIG. 14 is a flowchart illustrating a method implemented in a communication system, in accordance with one embodiment. The communication system includes a host computer, a base station and a UE which may be those described with reference to FIGS. 17 and 18. For simplicity of the present disclosure, only drawing references to FIG. 14 will be included in this section. In step 2010 of the method, the host computer provides user data. In an optional substep (not shown) the host computer provides the user data by executing a host application. In step 2020, the host computer initiates a transmission carrying the user data to the UE. The transmission may pass via the base station, in accordance with the teachings of the embodiments described throughout this disclosure. In step 2030 (which may be optional), the UE receives the user data carried in the transmission.

Figure 15:
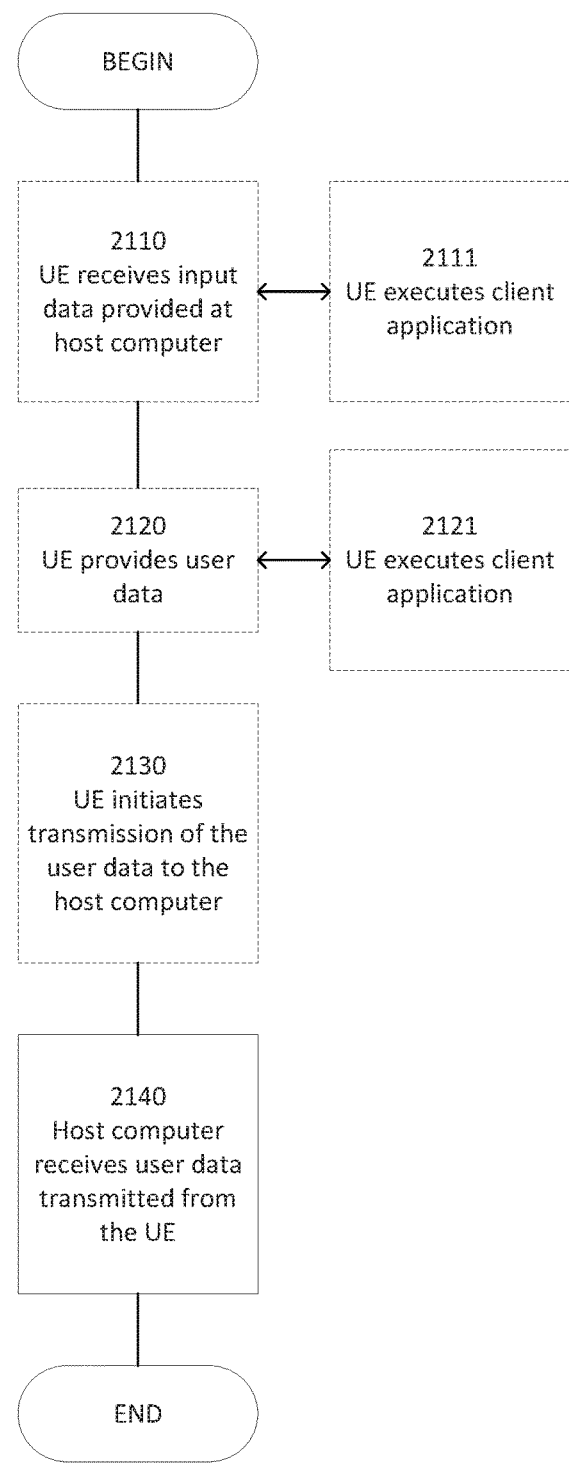
FIG. 15 is a flowchart illustrating a method implemented in a communication system, in accordance with one embodiment.

FIG. 15 is a flowchart illustrating a method implemented in a communication system, in accordance with one embodiment. The communication system includes a host computer, a base station and a UE which may be those described with reference to FIGS. 17 and 18. For simplicity of the present disclosure, only drawing references to FIG. 15 will be included in this section. In step 2110 (which may be optional), the UE receives input data provided by the host computer. Additionally or alternatively, in step 2120, the UE provides user data. In substep 2121 (which may be optional) of step 2120, the UE provides the user data by executing a client application. In substep 2111 (which may be optional) of step 2110, the UE executes a client application which provides the user data in reaction to the received input data provided by the host computer. In providing the user data, the executed client application may further consider user input received from the user. Regardless of the specific manner in which the user data was provided, the UE initiates, in substep 2130 (which may be optional), transmission of the user data to the host computer. In step 2140 of the method, the host computer receives the user data transmitted from the UE, in accordance with the teachings of the embodiments described throughout this disclosure.

Figure 16:
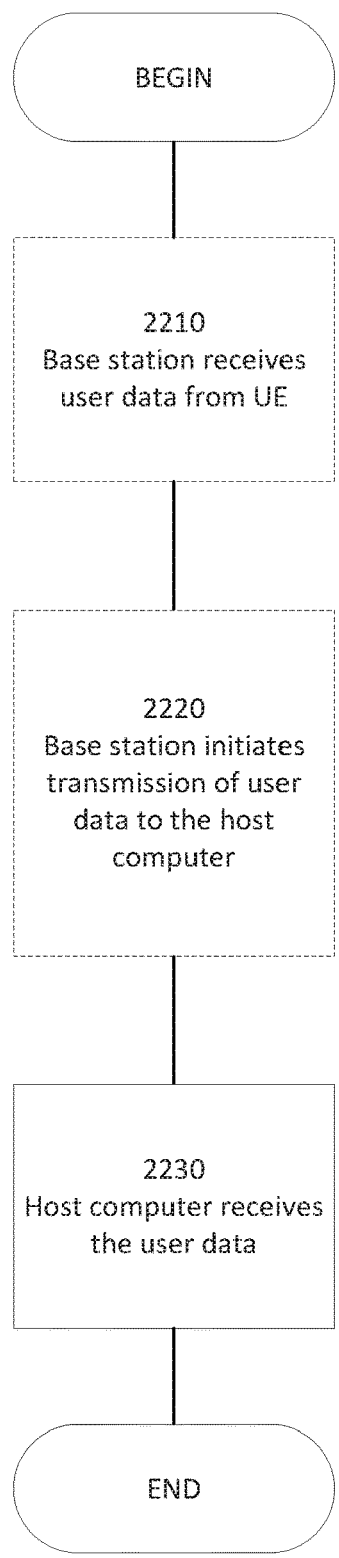
FIG. 16 is a flowchart illustrating a method implemented in a communication system, in accordance with one embodiment.

FIG. 16 is a flowchart illustrating a method implemented in a communication system, in accordance with one embodiment. The communication system includes a host computer, a base station and a UE which may be those described with reference to FIGS. 17 and 18. For simplicity of the present disclosure, only drawing references to FIG. 16 will be included in this section. In step 2210 (which may be optional), in accordance with the teachings of the embodiments described throughout this disclosure, the base station receives user data from the UE. In step 2220 (which may be optional), the base station initiates transmission of the received user data to the host computer. In step 2230 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the description.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Some of the embodiments contemplated herein are described more fully with reference to the accompanying drawings. Other embodiments, however, are contained within the scope of the subject matter disclosed herein. The disclosed subject matter should not be construed as limited to only the embodiments set forth herein; rather, these embodiments are provided by way of example to convey the scope of the subject matter to those skilled in the art.

What is claimed is:

1. A method performed by a user equipment, comprising:
  receiving a configuration that configures the user equipment with a resource that is to repeat in time according to an interval;
  receiving control signaling indicating a parameter N, wherein the parameter N indicates a number of repetitions of the resource that are to occur before the configuration is to be deactivated, wherein the control signaling is included in downlink control information;
  transmitting or receiving data on one or more repetitions of the resource according to the configuration; and
  deactivating the configuration upon occurrence of the number of repetitions of the resource indicated by the parameter N,
  wherein one or more bits in the downlink control information indicate whether the downlink control information includes the control signaling.

2. The method of claim 1, wherein the control signaling is received before transmitting or receiving the data on any of the repetitions of the resource.

3. The method of claim 1, wherein the control signaling is included in the configuration.

4. The method of claim 1, wherein the configuration is received via radio resource control (RRC) signaling.

5. The method of claim 1, further comprising activating the configuration upon receiving the configuration.

6. The method of claim 1, wherein the user equipment is a narrowband internet-of-things (NB-IoT) device.

7. A method performed by a network node, comprising:
  transmitting, to a user equipment, a configuration that configures the user equipment with a resource that is to repeat in time according to an interval;
  transmitting, to the user equipment, control signaling indicating a parameter N,
    wherein the parameter N indicates a number of repetitions of the resource that are to occur before the configuration is to be deactivated,
    wherein the control signaling is included in downlink control information;

transmitting or receiving data on one or more repetitions of the resource according to the configuration; and deactivating the configuration upon occurrence of the number of repetitions of the resource indicated by the parameter N, wherein one or more bits in the downlink control information indicate whether the downlink control information includes the control signaling.

8. The method of claim 7, wherein the control signaling is transmitted before transmitting or receiving the data on any of the repetitions of the resource.

9. The method of claim 7, wherein the control signaling is included in the configuration.

10. The method of claim 7, wherein the configuration is transmitted via radio resource control (RRC) signaling.

11. The method of claim 7, further comprising activating the configuration upon transmitting the configuration.

12. The method of claim 7, wherein the user equipment is a narrowband internet-of-things (NB-IoT) device.

13. The method of claim 7, further comprising determining the parameter N based on:

an amount of the data in an uplink or downlink buffer to be transmitted or received; and a transport block size limitation of the user equipment.

14. The method of claim 13, wherein determining the parameter N comprises determining the parameter N as being a number of transport blocks needed to transmit the amount of the data, where each transport block is limited in size according to the transport block size limitation.

15. The method of claim 7, further comprising determining the parameter N based on:

an amount of the data in an uplink or downlink buffer to be transmitted or received;

predicted traffic;

a quality of service profile; and/or overprovisioning to account for one or more retransmissions being needed.

16. A user equipment, comprising:

communication circuitry; and processing circuitry configured to:

receive a configuration that configures the user equipment with a resource that is to repeat in time according to an interval;

receive control signaling indicating a parameter N, wherein the parameter N indicates a number of repetitions of the resource that are to occur before the configuration is to be deactivated, wherein the control signaling is included in downlink control information;

transmit or receive data on one or more repetitions of the resource according to the configuration; and deactivate the configuration upon occurrence of the number of repetitions of the resource indicated by the parameter N, wherein one or more bits in the downlink control information indicate whether the downlink control information includes the control signaling.

17. A network node, comprising:

communication circuitry; and processing circuitry configured to:

transmit, to a user equipment, a configuration that configures the user equipment with a resource that is to repeat in time according to an interval;

transmit, to the user equipment, control signaling indicating a parameter N, wherein the parameter N indicates a number of repetitions of the resource that are to occur before the configuration is to be deactivated, wherein the control signaling is included in downlink control information;

transmit or receive data on one or more repetitions of the resource according to the configuration; and deactivate the configuration upon occurrence of the number of repetitions of the resource indicated by the parameter N, wherein one or more bits in the downlink control information indicate whether the downlink control information includes the control signaling.

* * * * *